(12) United States Patent
Fehrenbach et al.

(10) Patent No.: US 10,938,538 B2
(45) Date of Patent: Mar. 2, 2021

(54) TRANSMISSION CONCEPT USING MULTI-USER SUPERPOSITION CODING

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Cornelius Hellge, Berlin (DE); Johannes Dommel, Berlin (DE); Lars Thiele, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/271,741

(22) Filed: Feb. 8, 2019

(65) Prior Publication Data
US 2019/0173652 A1    Jun. 6, 2019

Related U.S. Application Data

(63) Continuation of application No. PCT/EP2017/070438, filed on Aug. 11, 2017.

(30) Foreign Application Priority Data

Aug. 11, 2016  (EP) ..................... 16183897

(51) Int. Cl.
*H04L 5/00*     (2006.01)
*H04L 27/34*    (2006.01)
(Continued)

(52) U.S. Cl.
CPC .......... *H04L 5/0073* (2013.01); *H04L 5/0037* (2013.01); *H04L 25/0204* (2013.01);
(Continued)

(58) Field of Classification Search
CPC ........... H04L 2027/002; H04L 25/0204; H04L 27/0014; H04L 27/2662; H04L 27/3455;
(Continued)

(56) References Cited

U.S. PATENT DOCUMENTS

| | | | |
|---|---|---|---|
| 2003/0126195 A1* | 7/2003 | Reynolds | ............ G06F 11/2023 709/203 |
| 2007/0195907 A1 | 8/2007 | Wang et al. | |

(Continued)

FOREIGN PATENT DOCUMENTS

| | | | |
|---|---|---|---|
| JP | 2003304215 A | 10/2003 | |
| JP | 2009525665 A | 7/2009 | |

(Continued)

OTHER PUBLICATIONS

Sharp: "Scalable numerology for New RAT"; 3GPP Draft; RI-163295, 3rd Generation Partnership Project (3GPP), Mobile Competence Centre ; 650, Route Des Lucioles ; F-06921 Sophia-Antipolis Cedex; France; vol. RAN WG1, No. Busan, Korea; 20160411-20160415; Apr. 2, 2016 (Apr. 2, 2016), XP051080609.

(Continued)

*Primary Examiner* — Mewale A Ambaye
(74) *Attorney, Agent, or Firm* — Michael A. Glenn; Perkins Coie LLP

(57) ABSTRACT

The transmission of data signals transmitted by a plurality of transmitters may be rendered more efficient by combining multi-user superposition coding with appropriate phase shift estimation at the receiver so that phase shift compensation at the transmitter's side may lead to a superposition of the data signals which may be demapped correctly so as to obtain information data per data signal. Owing to the combination, the concept is applicable to typical uplink situations or downlink situations of separate contributing BSs: contrary to the simple downlink situation where the data signals stem (Continued)

from one BS and are superimposed in one domain, namely the base station's domain, the data signals to be superimposed stem from separate transmitters, such as user entities or mobile terminals in the typical uplink situation, or different base stations in the downlink situation.

39 Claims, 18 Drawing Sheets

(51) Int. Cl.
  *H04L 27/36* (2006.01)
  *H04L 27/00* (2006.01)
  *H04L 25/02* (2006.01)
  *H04L 27/26* (2006.01)

(52) U.S. Cl.
  CPC ...... *H04L 27/0014* (2013.01); *H04L 27/2621* (2013.01); *H04L 27/2662* (2013.01); *H04L 27/3488* (2013.01); *H04L 27/367* (2013.01); *H04L 5/0051* (2013.01); *H04L 27/3411* (2013.01); *H04L 27/3455* (2013.01); *H04L 2027/002* (2013.01)

(58) Field of Classification Search
  CPC . H04L 27/3488; H04L 5/0037; H04L 5/0051; H04L 5/0073
  See application file for complete search history.

(56) References Cited

U.S. PATENT DOCUMENTS

| | | |
|---|---|---|
| 2008/0180679 A1 | 7/2008 | de Groot |
| 2012/0287801 A1 | 11/2012 | Wulich et al. |
| 2013/0010839 A1 | 1/2013 | Tsouri et al. |
| 2016/0056909 A1 | 2/2016 | Yasukawa et al. |
| 2016/0100414 A1 | 4/2016 | Guvenkaya et al. |
| 2018/0310252 A1* | 10/2018 | Wu .................... H04W 52/346 |
| 2018/0368111 A1* | 12/2018 | Yamada ............... H04W 72/042 |
| 2019/0098610 A1* | 3/2019 | Kim .................... H04L 5/0062 |
| 2019/0174424 A1* | 6/2019 | Xie .................... H04W 52/143 |

FOREIGN PATENT DOCUMENTS

| | | |
|---|---|---|
| JP | 2010513937 A | 4/2010 |
| JP | 2014204200 A | 10/2014 |

OTHER PUBLICATIONS

3GPP TR 45.820 v13.1.0 (Nov. 2015), 3rd Generation Partnership Project; Technical Specification Group GSM/EDGE Radio Access Network; Cellular system support for ultra-low complexity and low throughput Internet of Things (CIoT) (Release 13).

3GPP TR 36.859 v13.0.0 (Dec. 2015), 3rd Generation Partnership Project; Technical Specification Group Radio Access Network; Study on Downlink Multiuser Superposition Transmission (MUST) for LTE (Release 13).

* cited by examiner

```
-- ASN1START

PhysicalConfigDedicated ::=         SEQUENCE {
    pdsch-ConfigDedicated               PDSCH-ConfigDedicated
        OPTIONAL,        -- Need ON
    pucch-ConfigDedicated               PUCCH-ConfigDedicated
        OPTIONAL,        -- Need ON
    pusch-ConfigDedicated               PUSCH-ConfigDedicated
        OPTIONAL,        -- Need ON
    uplinkPowerControlDedicated         UplinkPowerControlDedicated
        OPTIONAL,        -- Need ON
    uplinkPhaseCompDedicated            UplinkPhaseCompDedicated
        OPTIONAL,        -- Need ON
    tpc-PDCCH-ConfigPUCCH               TPC-PDCCH-Config
        OPTIONAL,        -- Need ON
    tpc-PDCCH-ConfigPUSCH               TPC-PDCCH-Config
        OPTIONAL,        -- Need ON
    cqi-ReportConfig                    CQI-ReportConfig
        OPTIONAL,        -- Cond CQI-r8

...

-- ASN1STOP
```

Fig. 9

```
-- ASN1START

UplinkPhaseComoDedicated ::=        SEQUENCE {
    phaseInfos                          SEQUENCE OF PhaseInformation
}

PhaseInformation ::=                SEQUENCE {
    CHOICE {
        phase-ResourceIndex                 INTEGER (0..2047),
        phase-lot-ResourceIndex             SEQUENCE {
            carrier-ResourceIndex               INTEGER (0..2047),
            subband                             INTEGER (0..6)
        }
    }
    phase-UE-PUSCH                      INTEGER (-45..45)
}

-- ASN1STOP
```

-- ASN1START

```
BL-Config ::= SEQUENCE {
    blankingSubframeC-RNTI    C-RNTI        OPTIONAL,   -- Need OR
    bl-ConfigUL               BL-ConfigUL   OPTIONAL,   -- Need ON
}

BL-ConfigUL ::= CHOICE {
    release              NULL,
    setup                SEQUENCE {
        blankingSubframeIntervalUL    ENUMERATED {
                                          sf1, sf2, sf10, sf20, sf32, sf40,
                                          sf64, sf80, spare6,
                                          spare5, spare4, spare3, spare2,
                                          spare1},
        blankingSubframePattern       ENUMERATED {
                                          pt0, pt1, pt2, ...}
    }
}
```

-- ASN1STOP

Fig. 14

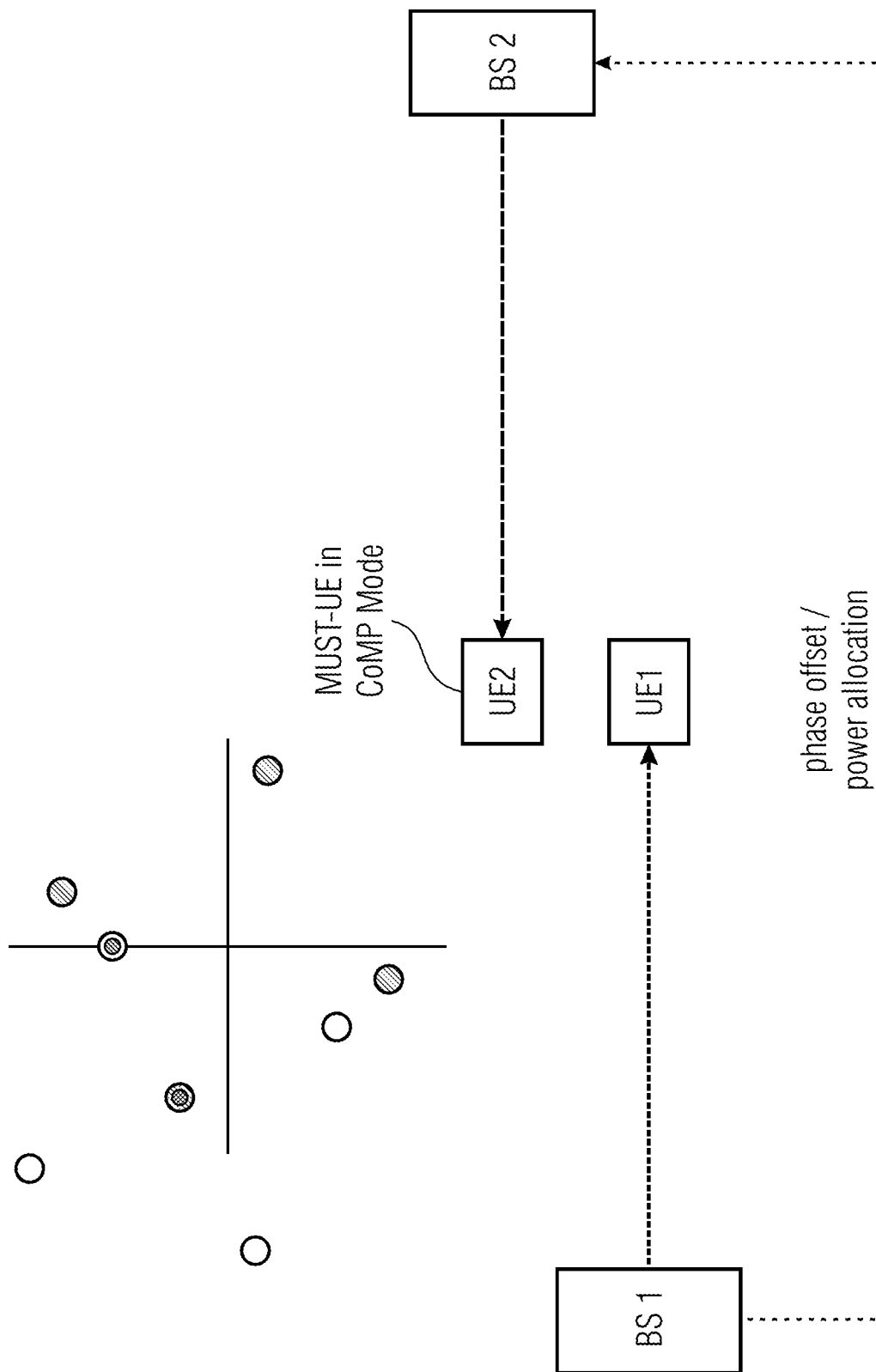

TRANSMISSION CONCEPT USING MULTI-USER SUPERPOSITION CODING

CROSS-REFERENCES TO RELATED APPLICATIONS

This application is a continuation of copending International Application No. PCT/EP2017/070438, filed Aug. 11, 2017, which is incorporated herein by reference in its entirety, and additionally claims priority from European Application No. EP 16 183 897.4, filed Aug. 11, 2016, which is incorporated herein by reference in its entirety.

The present application is concerned with a concept for transmission via multi-user superposition coding such as a transmission concept using multi-user superposition transmission (MUST).

BACKGROUND OF THE INVENTION

In downlink MUST, synchronization between the overlaid signals dedicated for different UEs can be simply ensured by the eNB. However for uplink MUST (UL-MUST), the problem is to decode the received composite constellation at the BS formed by different UEs. At the receiving BS, the component constellations from different UEs are effected by the independent channels (amplitude and phase) between UL-MUST UEs and BS. MUST-Cat. 2&3 is especially problematic in view of the label-bit assignment on the composite constellation. An example of the composite constellation for UL-MUST is depicted in FIG. 17. Also, the DL interference coordination case is critical if two BSs transmit on the same resources to the same UE as shown in FIG. 17b or different close by UEs as depicted in FIG. 17c, respectively.

It would be favorable to have a concept at hand which allows for exploiting the efficiency gains provided by multi-user superposition coding techniques in an uplink environment where the transmission is initiated on the UEs' side or in a DL interference scenario where the overlaid signals stem from different BSs and the transmission is initiated on the BSs' side.

SUMMARY

An example of the composite constellation for UL-MUST is depicted in FIG. 17. Also, the DL interference coordination case is critical if two BSs transmit on the same resources to the same UE as sown in FIG. 17b or different close by UEs as depicted in FIG. 17c, respectively. It would be favorable to have a concept at hand which allows for exploiting the efficiency gains provided by multi-user superposition coding techniques in an uplink environment where the transmission is initiated on the UEs' side or in a DL interference scenario where the overlaid signals stem from different BSs and the transmission is initiated on the BSs' side.

According to an embodiment, a receiver for receiving data signals from a plurality of transmitters using multi-user superposition coding may be configured to: estimate a phase shift between channels via which the receiver receives the data signals to obtain a phase shift information between the channels; send a phase shift compensation signal to at least one of the plurality of transmitters, the phase shift compensation signal depending on the phase shift information; and demap the data signals by performing demapping on a superposition of the data signals to obtain information data per data signal.

According to another embodiment, a transmitter for transmitting a data signal with superposition with a further data signal of a further transmitter at a receiver seeking to receive at least the further data signal using multi-user superposition coding may be configured to:
send a phase shift estimation reference signal to the receiver; receive a phase shift compensation signal responsive to the phase shift estimation reference signal; and map data using a constellation in a manner phase shift compensated according to the phase shift compensation signal to obtain the data signal.

According to another embodiment, a receiver for receiving a wanted data signal from a served transmitter may be configured to: estimate a phase shift between channels via which the receiver receives the wanted data signal and a interfering data signal sent from a transmitter served by a further receiver in a manner superpositioned with the wanted data signal to obtain a phase shift information between the channels; send a phase shift compensation signal to the further base station so as to be forwarded to the further transmitter, the phase shift compensation signal depending on the phase shift information; and demap the wanted data signal by performing demapping on a superposition of the wanted and interfering data signals using multi-user superposition decoding to obtain an information data for the wanted data signal.

According to another embodiment, a method for receiving data signals from a plurality of transmitters using multi-user superposition coding may have the steps of: estimate a phase shift between channels via which the receiver receives the data signals to obtain a phase shift information between the channels; send a phase shift compensation signal to at least one of the plurality of transmitters, the phase shift compensation signal depending on the phase shift information; and demap the data signals by performing demapping on a superposition of the data signals to obtain information data per data signal.

According to another embodiment, a method for transmitting a data signal with superposition with a further data signal of a further transmitter at a receiver seeking to receive at least the further data signal using multi-user superposition coding may have the steps of: sending a phase shift estimation reference signal to the receiver; receiving a phase shift compensation signal responsive to the phase shift estimation reference signal; and mapping data using a constellation in a manner phase shift compensated according to the phase shift compensation signal to obtain the data signal.

According to another embodiment, a method for receiving a wanted data signal from a served transmitter may have the steps of: estimate a phase shift between channels via which the receiver receives the wanted data signal and a interfering data signal sent from a transmitter served by a further receiver in a manner superpositioned with the wanted data signal to obtain a phase shift information between the channels; send a phase shift compensation signal to the further base station so as to be forwarded to the further transmitter, the phase shift compensation signal depending on the phase shift information; and demap the wanted data signal by performing demapping on a superposition of the wanted and interfering data signals using multi-user superposition decoding to obtain an information data for the wanted data signal.

According to another embodiment, a user entity for receiving a wanted data signal from a base station may be configured to: estimate a phase shift between channels via which the user entity receives the wanted data signal and an interfering data signal sent from a further user entity served by a further base station in a manner superpositioned with the wanted data signal to obtain a phase shift information between the channels; send a phase shift compensation signal to the base station so as to be forwarded to the further base station, the phase shift compensation signal depending on the phase shift information; and demap the wanted data signal by performing demapping on a superposition of the wanted and interfering data signals using multi-user superposition decoding to obtain an information data for the wanted data signal.

According to another embodiment, a method for receiving a wanted data signal from a base station may have the steps of: estimating a phase shift between channels via which the user entity receives the wanted data signal and an interfering data signal sent from a further user entity served by a further base station in a manner superpositioned with the wanted data signal to obtain a phase shift information between the channels; sending a phase shift compensation signal to the base station so as to be forwarded to the further base station, the phase shift compensation signal depending on the phase shift information; and demapping the wanted data signal by performing demapping on a superposition of the wanted and interfering data signals using multi-user superposition decoding to obtain an information data for the wanted data signal.

An embodiment may have a non-transitory digital storage medium having a computer program stored thereon to perform the method for receiving data signals from a plurality of transmitters using multi-user superposition coding, the method including: estimate a phase shift between channels via which the receiver receives the data signals to obtain a phase shift information between the channels; send a phase shift compensation signal to at least one of the plurality of transmitters, the phase shift compensation signal depending on the phase shift information; and demap the data signals by performing demapping on a superposition of the data signals to obtain information data per data signal, when said computer program is run by a computer.

An embodiment may have a non-transitory digital storage medium having a computer program stored thereon to perform the method for transmitting a data signal with superposition with a further data signal of a further transmitter at a receiver seeking to receive at least the further data signal using multi-user superposition coding, the method including: sending a phase shift estimation reference signal to the receiver; receiving a phase shift compensation signal responsive to the phase shift estimation reference signal; and mapping data using a constellation in a manner phase shift compensated according to the phase shift compensation signal to obtain the data signal, when said computer program is run by a computer.

It is a basic finding of the present application that the transmission of data signals transmitted by a plurality of transmitters may be rendered more efficient by combining multi-user superposition coding with appropriate phase shift estimation at the receiver so that phase shift compensation at the transmitter's side may lead to a superposition of the data signals which may be demapped correctly so as to obtain information data per data signal. Owing to the combination, the concept is applicable to typical uplink situations or downlink situations of separate contributing BSs: contrary to the downlink situation where the data signals stem from one BS and are superimposed in one domain, namely the base station's domain, the data signals to be superimposed stem from separate transmitters, such as user entities or mobile terminals in the typical uplink situation, or different base stations in the downlink situation. Here, the estimation of the phase shift on the side of the receiver, i.e. BS in the former case and UE in the latter case, and the signaling of a phase shift compensation signal to at least one of the participating transmitters enables to compensate the phase shift at the transmitter's side when mapping data onto the respective transmitter's constellation. The concept is, according to alternative embodiments, used to mitigate inter-cell interference situations.

In accordance with an embodiment of the present application, in addition to the phase shift estimation at the side of the receiver on the basis of a phase shift estimation signal sent from the transmitters to the receiver, followed by sending of a corresponding phase shift compensation signal from receiver to at least one of the transmitters, a power ratio estimation is performed at the receiver side with subsequent sending of a power ratio compensation signal to at least one of the transmitters. The recipient of the power ratio compensation signal may or may not be the same as the one of the phase shift compensation signal. While the application of the phase shift compensation signal on the transmitter's side reduces the phase shift between the transmitters' data signals superimposing at the receiver, the amplitude ratio compensation signal is for reducing a deviation of the amplitude ratio between the data signals superimposing at the receiver from a target ratio. The target ratio may be, or could be, for instance, near to 1:2: . . . : $2^N$ or similar ratios with N being the number of transmitters participating in the multi-user superposition coding transmission. Other ratios may apply as well. The transmitters use the power ratio compensation signal for appropriately setting a power at which the respective transmitter sends out its data signal.

In accordance with an embodiment, the power ratio compensation signal allows for a setting of the power at the transmitter's side in units smaller than, or finer than, the transmit power control signals sent from the receiver to all served transmitters including the ones participating in the multi-user superposition coding transmission for controlling the respective uplink power. In effect, this may end-up such that, when performing the multi-user superposition coding transmission on a first component carrier aggregated with an anchor or a second component carrier, the quantization accuracy or step-size at which the amplitude ratio compensation signal controls the power on the first component carrier exceeds the quantization accuracy of transmit power control signals used to control the transmit power on the anchor or second component carrier. By this measure, the legacy transmitters being not able to cope with power ratio compensation signals of finer granularity may further be served on the anchor or second component carrier, the transmit power of which is controlled using the lower quantization accuracy.

In accordance with an embodiment of the present application, more than N>1 data signals participate in the multi-user superposition coding transmission with the target ratio of $a_1:a_2: \ldots :a_N$ from a first to $N^{th}$ data signal with $a_1$, $a_2<a_3$, $a_4< \ldots <a_N$, wherein each data signal is separately BSPK modulated. The $(2n+1)^{th}$ data signal's BPSK constellation is rotated relative to the $(2(n+1))^{th}$ data signal's BPSK constellation, with $-1<n<N/2$. By this measure, N>1 such as two, three, four or even more data signals may effectively share a common physical resource resulting in a composed constellation of $2^N$ constellation points regularly spaced in a grid in the complex-valued domain resulting from recursively copying the BPSK constellations of the $1^{st}$ to $N^{th}$ data signals one upon the other sequentially.

In accordance with an embodiment, a physical random access channel (PRACH) is used for sending the phase shift estimation reference signal (PSERS). The sending may take place at an end of active phases of the PRACH so that random access PRACH signals do not interfer with the actual PSERS. The advantage thereof is that PRACH signals are already sent from legacy transmitters, and accordingly legacy transmitters may participate in the multi-user superposition coding transmission without knowing that the data signals they transmit may arrive at the receiver in a manner superimposed with a data signal of another transmitter which sends its data signal on behalf of the receiver on the same physical resource in a piggyback manner.

In accordance with an embodiment, the phase shift compensation signal, the amplitude ratio compensation signal and/or the reference signal scheduling signal for scheduling the sending of the phase shift estimation reference signal, is sent from receiver to the respective transmitter via a downlink control information (DCI) message and/or via a radio resource control (RRC) message.

In order to reduce the control overhead caused by sending the phase shift and/or amplitude ratio compensation signals, one or both of them may be sent within messages of a first type and messages of a second type, with sending messages of first and second types in a differently frequent manner. In doing so, the messages of the first type, for example, could be sent less frequently but in a manner allowing for signaling phase offset not representable by the respective signal within the messages of the second type. A similar effect could be achieved by providing messages with an indicator field changing the way another field is read, such as a phase shift field in case of a phase shift compensation signal or a power control field in case of an amplitude ratio compensation signal.

In accordance with a further embodiment, the phase shift compensation is attained by the phase shift compensation signal in a successive manner by indicating a phase shift to be taken into account in the next task of mapping data onto the respective transmitter's constellation relative to a current phase shift used by the recipient of the phase shift correction signal, i.e. the respective transmitter, when mapping data onto its constellation. By this manner, the overhead in sending the phase shift compensation signal is further reduced.

In accordance with a further embodiment, the phase shift compensation signal may be coded using predictive coding, i.e. merely a prediction residual is coded, or merely a weight for updating the prediction algorithm for instance. Transmitter and receiver would, in this case, predict the phase shift to be used with merely the prediction residual, i.e. the difference between the actual phase shift to be used and the predicted one, being signaled by way of the phase shift correction signal, or the prediction algorithm would continuously be updated using weight updates and the prediction thus obtained using the updated prediction algorithm would be used.

BRIEF DESCRIPTION OF THE DRAWINGS

Embodiments of the present invention will be detailed subsequently referring to the appended drawings, in which:

FIG. 9 shows an example for an RRC physical channel reconfiguration;

FIG. 10 shows an exemplary RRC uplink phase compensation signaling;

FIG. 13 shows a table with an example of blanking patterns;

FIG. 14 shows an example for an RRC message for configuring semi-persistent blanking;

FIG. 17*a-c* shows a schematic diagram illustrating the general superposition coding in a) an uplink situation, and a downlink situation with the superimposing signals stemming from different BSs and b) being targeted to one UE or c) different, but nearby UEs, but without any CSI and phase compensation.

DETAILED DESCRIPTION OF THE INVENTION

Figure 1:
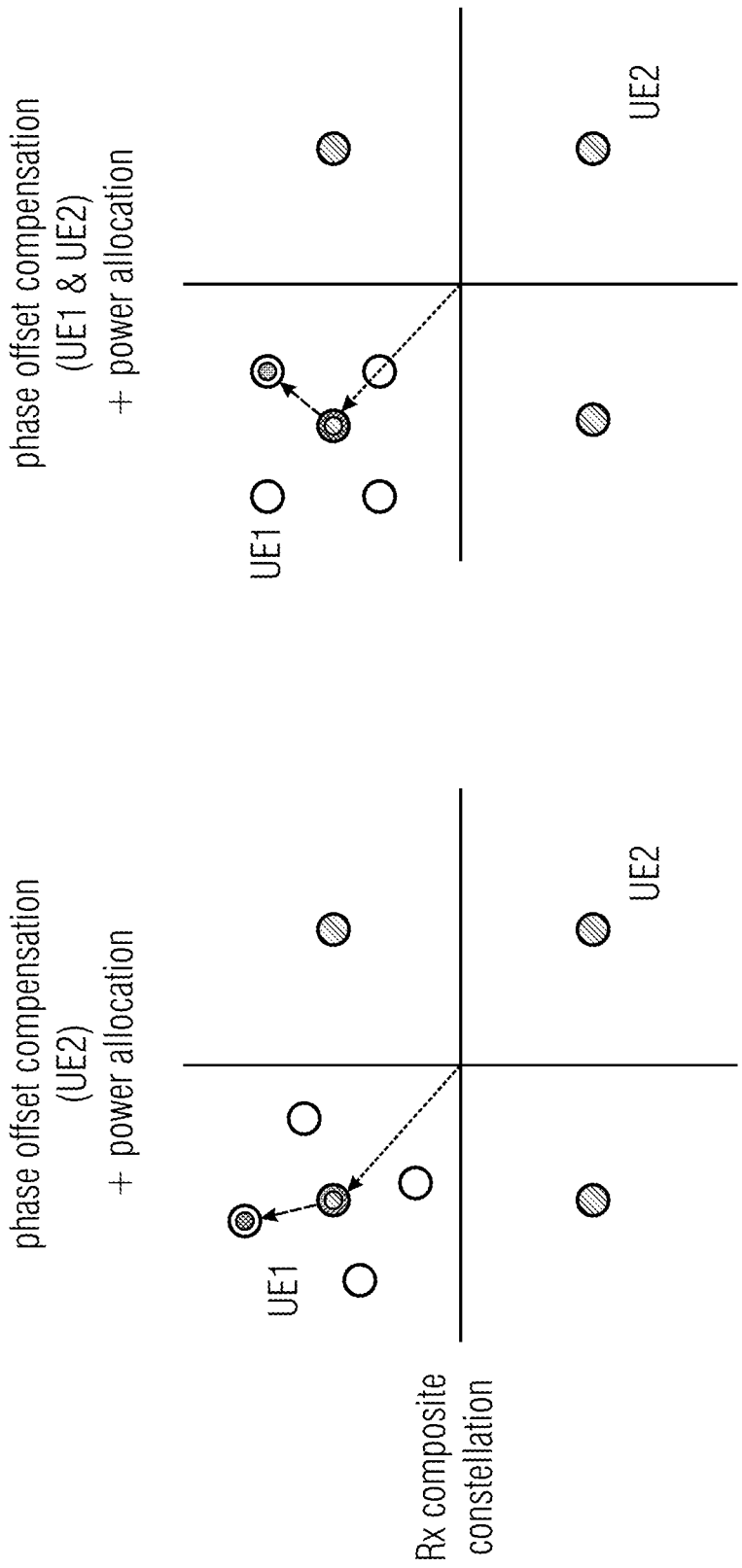
FIG. 1 shows a schematic diagram illustrating the mutual rotation of constellations of superpositioned data signals with, at the left-hand side, power allocation for both participating UEs UE1 and UE2 and phase offset compensation merely at UE2 and, at the right-hand side, power allocation and phase offset compensation at both UEs.

In order to motivate an easy understanding of the following description of embodiments of the present application, with respect to FIG. 1 the description in the introductory portion of the specification of the present application with respect to usage of multi-user superposition transmission in downlink scenarios and the problems associated with seeking to transfer this transmission concept to uplink is resumed. Accordingly, the considerations set out for this motivation should not be treated as limiting with respect to the embodiments of the present application described subsequently.

In order to decode a MUST composite constellation, the receiver, i.e. the base station in uplink case or UEs in DL case, needs channel state estimation of participating UL-MUST UEs in case of UL-(uplink) MUST or of participating BSs from which the superimposing signals stem in case of DL (downlink) MUST, or interference coordination, in order to compensate for the mutual interference of the superimposing data signals. Let's preliminarily inspect the situation for UL MUST. The preliminary focusing on the uplink case shall not be treated as limiting. The details set out with respect to the UL case are readily transferrable onto the downlink situation with different contributing BSs and embodiments related to the latter case are discussed hereinafter after the ones concerning UL MUST. In order to improve UL-MUST power allocation and phase offset compensation can be exploited in order to optimize composite constellation. FIG. 1 shows the effect of such phase offset compensation and power allocation control. The left-hand side of FIG. 1 shows the rotation of a QAM constellation (bold circles) of a first transmitter or user entity UE1 relative to the constellation points of a QAM constellation of another transmitter UE2 (hatched circles) in the complex domain, the rotation resulting from a phase offset of UE2 being assumed here as being compensated, whereas any phase offset is not compensated for so that the rotation of the QAM constellation of UE1 relative to the QAM constellation of UE2 is the result of an arbitrary difference in the channel connecting UE1 with the receiver and UE2 with the receiver, respectively. Both UEs, i.e. UE1 and UE2, are assumed to be already power controlled, so that UE1's data signal arrives at the receiver, i.e. the base station, at less power than compared to the data signal of UE2 manifesting itself in the QAM constellation points of UE1 being less spread, or demagnified, relative to the QAM constellation of UE2. The right-hand side of FIG. 1 shows the change in the situation occurring when both transmitters, i.e. UE1 and UE2, are phase offset compensated. As described further below, this may be performed by UE1 pre-rotating its QAM constellation appropriately in order to compensate for, or reduce, the phase shift the data signals of UE1 and UE2 experience on their way to the receiver or base station. As can be seen at the right-hand side of FIG. 1, the constellation points of UE1 are now registered to the access of the complex domain just as the constellation points of the constellation of UE2 are, so that in the present case, where both constellations of UE1 and UE2 are of the same type, namely QAM, the constellation points of UE1 may be transformed onto the constellation points of UE2 by a translatory shift and isotropic scaling in the complex domain exclusively, i.e. rotation may not be used. For illustration purposes, FIG. 1 shows UE2 as having mapped its data to be transmitted onto a constellation point in the upper left quadrant (shown by a hatched arrow), whereas UE1 has mapped its data to be transmitted onto the constellation point at the upper right hand quadrant (shown by a continuous line arrow). As will be outlined in more detail below, the receiver has no problem in demapping the superposition of inbound data signals, as the mapped superposition arriving at the receiver, to which the continuous line error in FIG. 1 points, may for instance be subject to a successive interference cancellation by first mapping this constellation point to any of the constellation points of UE2's QAM constellation by associated, for example, the superposition signal's point to the UE2's QAM constellation point residing in the same quadrant as the superposition constellation point, and then associating the superposition constellation point to one of UE1's QAM constellation points by evaluating the relative position of the superposition constellation point relative to the QAM constellation point of UE2's constellation previously determined for UE2's data signal. The following description will show that the number of participating UEs is not restricted to be two, and that other component constellations may be used by the participating UEs as well.

The following description primarily relates to the phase shift control, assuming that regular UL power control is already installed between the participating UEs, but some embodiments also relate to possibilities as to how to improve the power allocation.

Thus, briefly summarizing the introduction into the subsequent embodiments, as brought forward with respect to FIG. 1, it is noted that the outlined phase shift compensation enables to use multi-user superposition coding in uplink, and it is briefly noted here that no solution exists for such a possibility within, for instance, the LTE specification.

In LTE, superposition coding for downlink (DL) is described in [1]. As described therein, multi-user superposition transmission (MUST) is used as a downlink scheme, namely a multiple access scheme were multiple users are co-scheduled on the same physical resource elements without spatial separation. Such non-orthogonal transmission allows to improve the MU system capacity and/or number of connected devices in the network. The idea is that the base station (BS) on the transmit side creates composite constellations for independent data streams. At the receiver side, the data-streams can be separated by using successive interference cancellation—based receiver structures. Three MUST categories are specified for the downlink (DL) direction [1], see Table 1

TABLE 1

Classification of MUST schemes and their key characteristics

| Category | Power Ratio | Gray Mapping | Label-bit assignment |
|---|---|---|---|
| MUST Category 1 | Adaptive, on component constellations | N | On component constellation |
| MUST Category 2 | Adaptive, on component constellations | Y | On the composite constellation |
| MUST Category 3 | N/A | Y | On the composite constellation |

Figure 2:
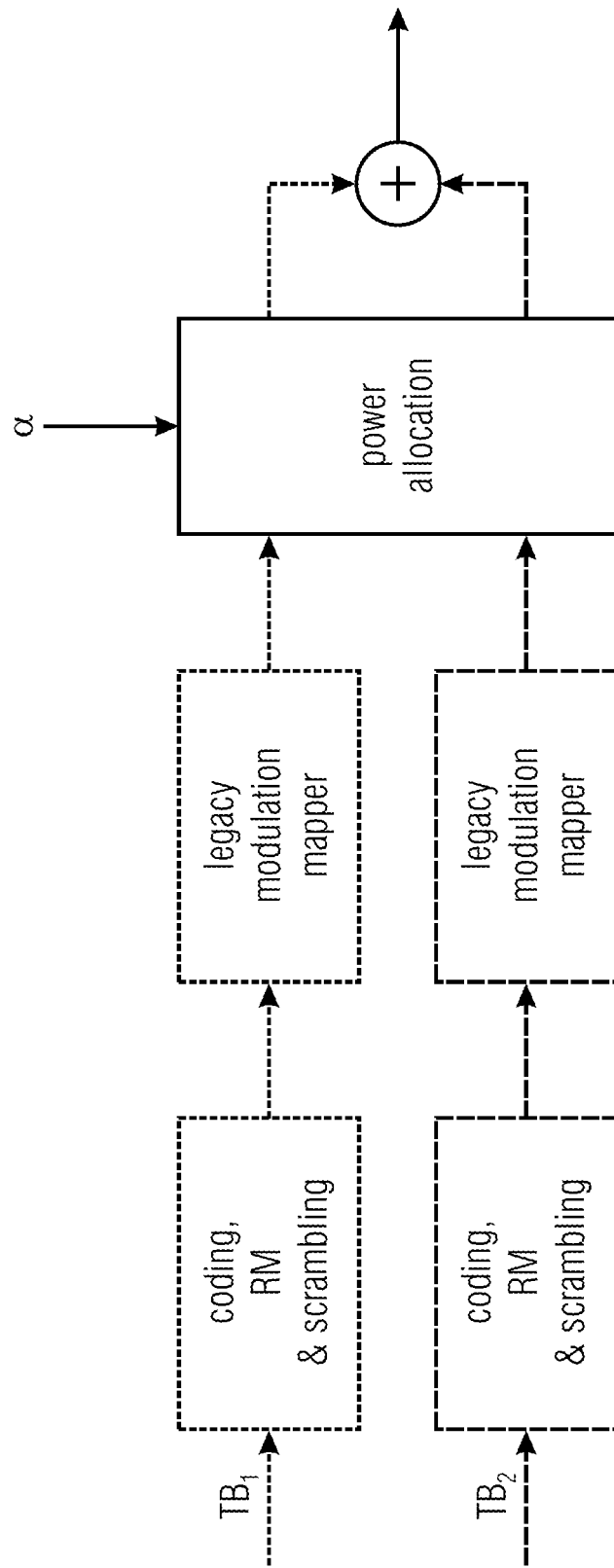
FIG. 2 shows a block diagram of a transmission path of a base station for downlink MUST.

An example of transmitter side processing for category 1 is shown in FIG. 2 [left]. After independent channel coding, rate matching (RM), scrambling and mapping to the modulation symbols, the signals of MUST-near UE and MUST-far UE are combined with amplitude-weight weight $\sqrt{\alpha}$ and $\sqrt{1-\alpha}$, respectively, where ac is the transmission power ratio for a MUST-near user.

Figure 3:
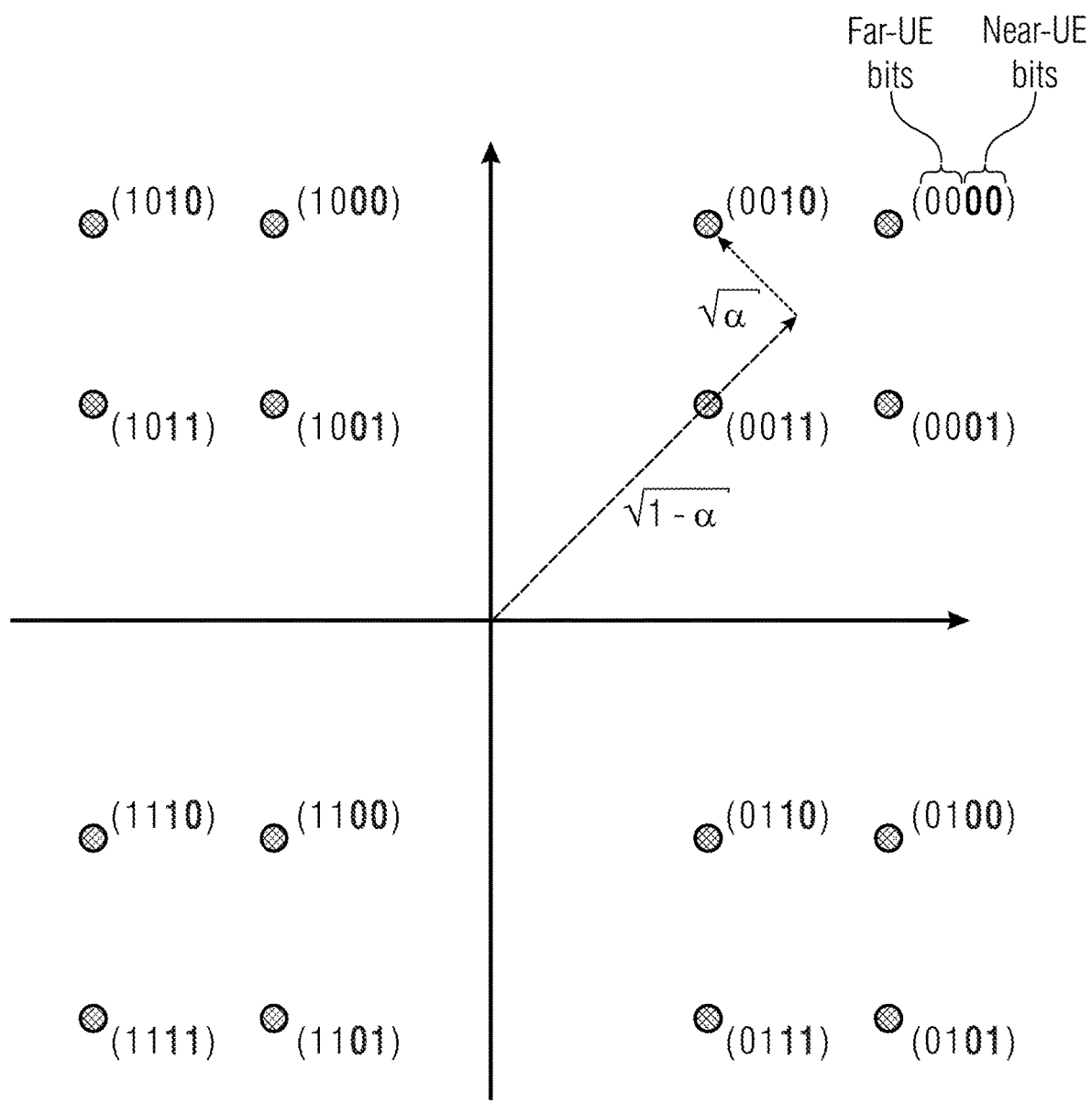
FIG. 3 shows a schematic diagram of a composite constellation of MUST category 1.

FIG. 3 shows an example composite constellation of MUST Category 1.

It is noted that the composite constellation shown in FIG. 3 corresponds to the one used by the receiver, i.e. base station, in the illustrative case of FIG. 1 in order to demap the superimposed data signals.

Figure 4:
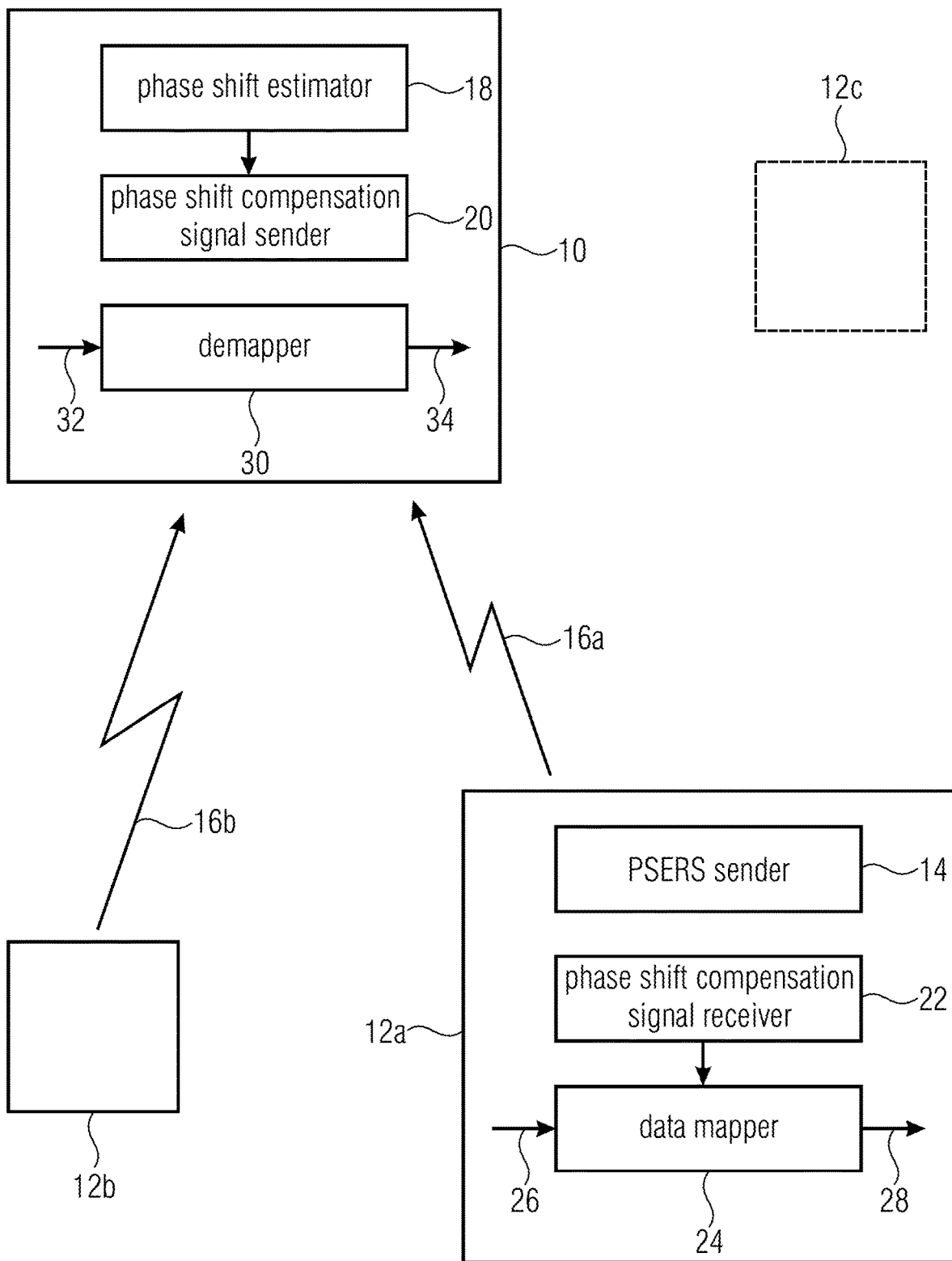
FIG. 4 shows a block diagram of a receiver and a block diagram of a transmitter in accordance with an embodiment of the present application, both shown in a scenario along with another transmitter for transmitting, in a superpositioned manner, a data signal to the receiver.

With respect to FIG. 4, a multi-user superposition coding transmission concept is described. FIG. 4 shows a receiver in accordance with an embodiment of the present application as well as two transmitters in accordance with an embodiment of the present application. The receiver is indicated using reference sign 10 and the transmitters are indicated using reference sign 12, with the alphabetic index discriminating between individual transmitters. In particular, receiver 10 could be a base station while transmitters $12_a$ to $12_c$ are mobile terminals or user entities. Although each transmitter 12 may look the same, an internal structure is representatively indicated in FIG. 4 for transmitter $12_a$. Transmitter $12_b$ may have the same internal structure and functionality as described with respect to transmitter $12_a$, but in accordance with embodiments also discussed below, transmitter $12_b$ may not comprise some of the special features of transmitter $12_a$.

Receiver 10 is for receiving data signals from transmitters $12_a$ and $12_b$ using multi-user superposition coding in a manner described below and the transmitters $12_a$ and $12_b$, in turn, are for transmitting a respective data signal for reception at the receiver 10 in a manner superimposed mutually.

As shown in FIG. 4, transmitter $12_a$ (and accordingly also transmitter $12_b$), comprises a phase shift estimation reference signal (PSERS) sender 14 configured to send a phase shift estimation reference signal to receiver 10. The phase shift estimation reference signal enables receiver 10 to estimate a phase shift between the channels 16a via which the corresponding transmitter $12_a$ sends its data signal subject to a multi-user superposition coding to receiver 10. In a similar manner, transmitter $12_b$ does the same, i.e. sends a PSERS via its connecting channel 16b to receiver 10. Receiver 10 comprises a phase shift estimator 18 for estimating a phase shift between channel 16a and 16b. To this end, phase shift estimator 18 evaluates the phase shift estimation reference signals received from transmitters $12_a$ and $12_b$, respectively. Later on, exemplary embodiments are described as to how receiver 10 could achieve that the phase shift estimation reference signals are received at receiver 10 sequentially and individually without collision or coincidence of sending of phase shift estimation reference signals from different transmitters $12_a$, $12_b$ or any additional transmitter $12_c$ served by receiver 10, but not participating, for example, in the multi-user superposition coding between the data signals of transmitters 12a and $12_b$, respectively, with such exemplary additional transmitter being shown in FIG. 4, for instance, using reference sign $12_c$.

Receiver 10 comprises a phase shift compensation sender signal 20 which receives from phase shift estimator 18 the phase shift information between the channels obtained by the phase shift estimation and sends a phase shift compensation signal to at least one of the plurality of transmitters. In FIG. 4 it is assumed that transmitter $12_a$ receives the phase shift compensation signal sent by sender 20. To this end, transmitter $12_a$ comprises a phase shift compensation signal receiver 22. Later on, embodiments for the phase shift compensation signal are described in more detail. For example, concepts are described which enable keeping the signalization overhead low. In accordance with these embodiments, the phase shift compensation signal may, for instance, be included within downlink control information (DCI) messages and/or radio resource control (RRC) messages sent from receiver 10 to transmitter $12_a$, and optionally all transmitters $12_a$ to $12_c$ served by receiver 10.

The phase shift compensation signal is selected such that the phase shift compensation signal leads to a reduction or compensation of any phase shift between channels 16a and 16b. Such phase shift results, for instance, from respective different distances of transmitters $12_a$ and $12_b$ from receiver 10. As shown in FIG. 4, transmitter $12_a$ comprises a mapper 24 which maps data to be transmitted using a certain constellation in a manner phase shift compensated according to the phase shift compensation signal, thereby obtaining the data signal finally to be sent over channel 16a to receiver 10 in a manner superimposed by a corresponding data signal sent from transmitter $12_b$. For example, data mapper 24 maps the data 26 to be transmitted onto a certain constellation selected, for instance, on the basis of certain channel conditions such as QPSK, QAM or the like. However, data mapper 24 rotates, as described in more detail below, its constellation to account for the phase shift between its channel 16a and the channel 16b of the multiple-user superposition partner $12_b$. The thus obtained data signal 28 is then, for instance, used to form a certain OFDM subcarrier of an OFDM or SC-FDM or OFDMA or SC-FDMA signal finally sent out by transmitter $12_a$ to receiver 10 so that the mentioned subcarrier coincides with the subcarrier onto which a corresponding mapper of transmitter $12_b$ maps its own data.

Receiver 10 comprises a demapper 30 which receives the superpositioned data signal, i.e. the superposition of the data signal on the corresponding OFDM subcarrier, indicated with 32 in FIG. 4, which points to a certain point in the complex plane, and obtains, by performing the demapping, an information data for each data signal, i.e. data signal 28 sent from transmitter $12_a$ and the corresponding data signal sent from transmitter $12_b$. To this end, demapper 30 performs successive interference cancellation (SIC), i.e. sequentially performs the demapping explained above with respect to FIG. 1, for instance. That is, demapper 30 obtains, for instance, the information data for the "stronger" data signal first, i.e. the data signal from the "nearer" transmitter, and then derives the information data for the "farther" transmitter. The demapping 30 may be a hard demapping with the information data being one or more bits, or soft demapping with the information data being values between 0 and 1, both inclusively. The information data 34 thus obtained by demapper 30 for transmitter $12_a$ and $12_b$, respectively, may then be subject to further processing such as channel decoding including, for instance, deinterleaving, forward error correction, descrambling, depuncturing or the like, performed for each transmitter $12_a$ and $12_b$, respectively, separately. In the end, this means that transmitter $12_a$ may comprise a corresponding channel coder, interleaver, scrambler, and/or puncturer upstream data mapper 24 and receiver 10 may comprise upstream demapper 30, a decomposer decomposing inbound OFDM, SC-FDM or OFDMA or SC-FDMA symbols into OFDM subcarriers, among which one carries the superpositioned data signal.

From the following description, and although described differently above, it becomes clear that transmitter $12_b$ may not comprise a phase shift compensation signal receiver and/or may not involve demapper 24 taking any phase shift compensation signal in demapping into account. Rather, transmitter $12_b$ may even be agnostic with respect to the fact that transmitter $12_a$ transmits, in a piggyback manner on data signal channel 16b, a further data signal which is then subject to multi-user superposition (de)coding at receiver 10 in the manner described above.

Figure 5:
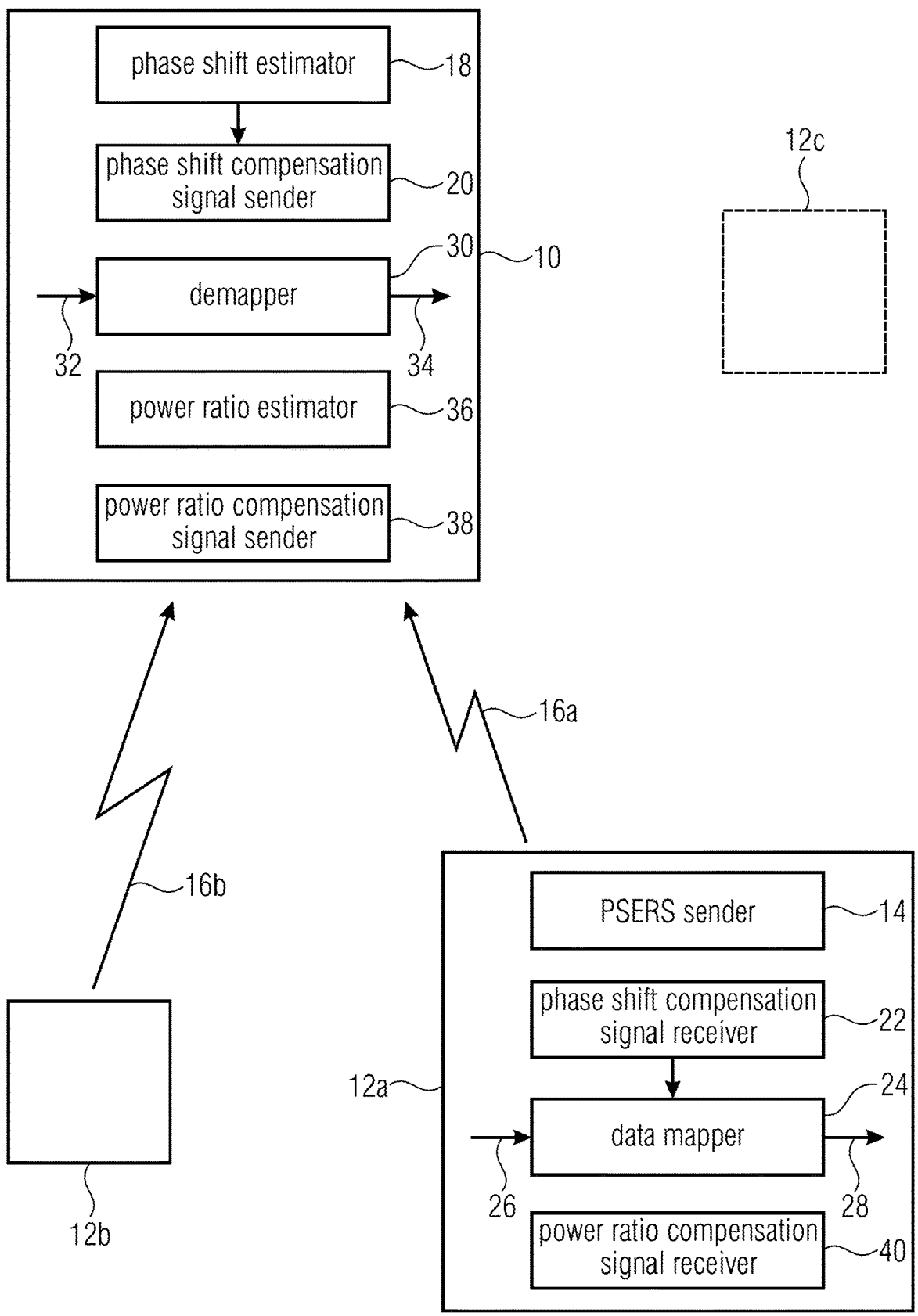
FIG. 5 shows a block diagram of a receiver and a block diagram of a transmitter in a scenario of FIG. 4 in accordance with an alternative embodiment also including power ratio estimation.

FIG. 5 shows a receiver 10 and a transmitter $12_a$ in accordance with a further embodiment of the present application. Here, receiver 10 additionally comprises a power ratio estimator 36 configured to estimate a power ratio between the plurality of transmitters to obtain a power ratio information. A sender 38 sends a power ratio compensation signal depending on the power ratio information to at least one of transmitters $12_a$ and $12_b$. FIG. 5 shows that transmitter $12_a$ comprises a corresponding power ratio compensation signal receiver 40, but as already denoted above, this is merely an example and a corresponding receiver 40 may alternatively or additionally be comprised by transmitter $12_b$. Transmitter $12_a$ sets a power at which the data signal 28 is transmitted depending on the power ratio compensation signal. In effect, the power set may affect the whole set of subcarriers which the subcarrier of data signal 28 is part of. That is, the whole OFDM/SC-FDM/OFDMA/SC-FDMA symbol carrying a plurality of OFDM subcarriers including the one onto which mapper 24 has mapped data 26, is subject to a power setting according to the power ratio compensation signal received by receiver 40.

As became clear from the above, a power ratio compensation signal sent by sender 38 and received by receiver 40 is for reducing a deviation of the power at which the data signals participating in the multi-user superposition coding superimpose each other at receiver 10 from a certain target power ratio achieving, for instance, that the composite constellation using which demapper 30 demaps the superpositioned data signals, has its constellation points distributed in the complex domain most efficiently.

The following description continues with a description of certain embodiments of the present application providing possible implementation details in accordance with various aspects involved in the multi-user superposition coding concept described so far. Insofar, the aspects described below may be individually or in a combined manner combined with the embodiments described with respect to FIGS. 4 and 5, respectively. In order to structure these aspects, they are structured into sections.

[E1] Phase Shift Estimation

The following details and embodiments relate to the phase shift estimation. It is assumed merely for illustration purposes that the multi-user superposition coding is between an LTE UE on the narrow band-internet of things uplink (NB-IOT UL) carrier. But the details set forth below may be readily be transferred to any other example. To be more precise, the following explains an estimation of relative phase offset between the constellations of co-scheduled LTE-UEs and NB-IOT devices in order to enable MUST category 1 transmission on an UL on the NB-IOT UL carrier. The estimation is performed by an estimation transmission of the LTE-UE on the NB-IOT UL carrier.

[E1.1] PRACH Usage as Phase Shift Estimation Reference Signal (PSERS)

In particular, when exemplarily using the NB-IOT UL as the "playground" of MUST, then the PRACH for LTE UEs on 160 kHz M-PRACH may be used as the PSERS. In other words, the phase offsets of LTE UEs in the NB-IOT carrier may be estimated by exploiting the M-PRACH. The LTE UE sends a phase shift estimation reference signal (PSERS) which can be based on a PRACH sequence, DMRS or SRS, on the M-PRACH to enable estimation of phase offset at the base station, i.e. eNB. This reference signal would then be limited to a bandwidth of 160 kHz, which corresponds to the bandwidth of the M-PRACH, as described in [2].

Figure 6:
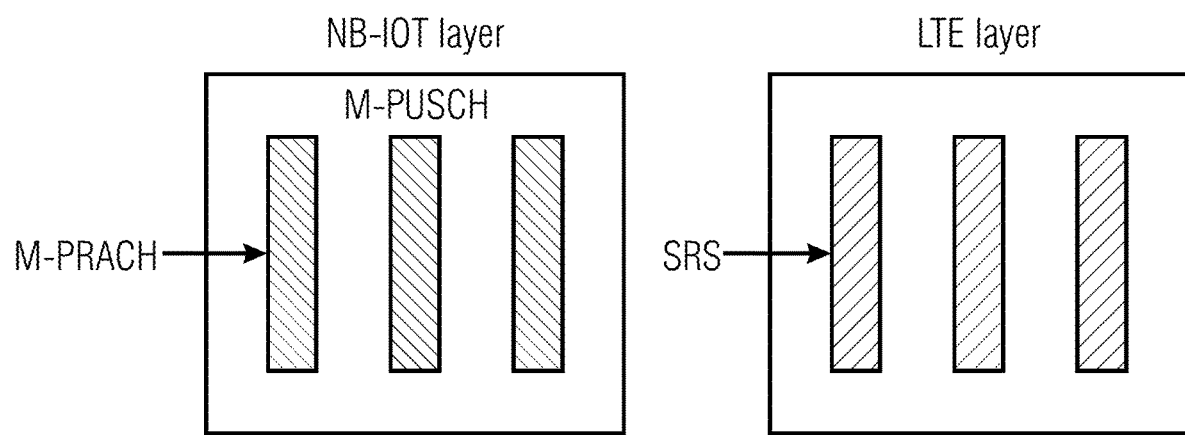
FIG. 6 shows a schematic diagram illustrating the overlay of LTE-SRS in NB-IoT M-PRACH.
Figure 7:
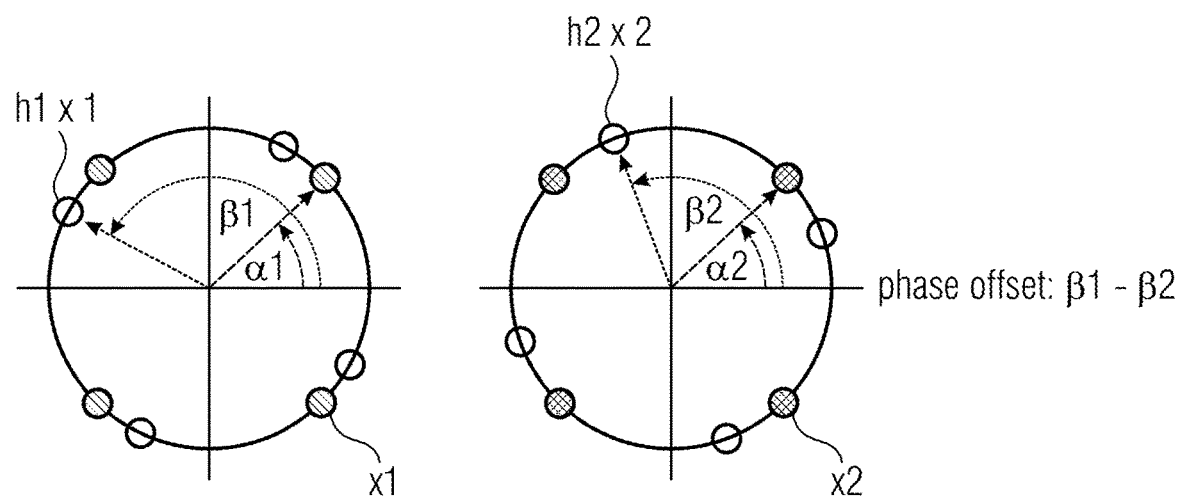
FIG. 7 shows a schematic diagram illustrating rotations of constellations of data signals as received by a receiver owing to the channel phase of the channels via which the data signals arrive at the receiver, with illustrating the resulting phase offset/shift therebetween, i.e. illustrating the Rx constellations at the receiver or base station.

FIG. 6 illustrates the overlay of an LTE-SRS in the NB-IoT M-PRACH. Based on these PRACH signals sent from the participating UEs, the phase offset may then be determined as shown in FIG. 7 individually showing how the constellations of the inbound component data signals are affected by the channel phase. The data signal, the constellation of which is shown in the left-hand side of FIG. 7, arrives by an angle ⊕1-α1 so that the QAM top right constellation point is at angle β1, whereas the second data signal's QAM constellation is tilted by angle β2-α2 so that the top right hand constellation QAM point occurs at β2, with the phase offset or phase shift relative between both data signals being β1-β2.

Relating to the description of FIGS. 4 and 5, this means that the PSERS described before with respect to FIGS. 4 and 5 may be a PRACH sequence, a DMRS or SRS sent during a PRACH phase. Details on how receiver 10 could manage to coordinate the served transmitters 12 such that receiver 10 receives the PSERSs from the individual transmitters individually is described further below.

[E1.1.1] Interference Avoidance with Possible RA Attempts

In order to avoid the just mentioned interference with possible RA (random access) attempts of not yet served transmitters during a PRACH phase, such as on the NB-IOT carrier, the following measure could be installed. As the PRACH can be done without exact synchronization to the network (timing advance), there has to be guard at the end of the PRACH to avoid interference. This guard interval, in turn, could be used by precisely synchronized, i.e. already served, LTE UEs for channel/phase estimation to avoid interference with possible NB-IOT random access (RA) attempts.

In relation to the description of FIGS. 4 and 5, this means that PSERS sender 14 could send its PSERS at the end of the PRACH phase, where transmitters trying to randomly access the service by receiver 10 are not to send their PRACH for random access.

[E1.2] eNB Assisted PRACH/RS for LTE UE

It may be possible that the base station, i.e. eNB, assists the LTE UE to transmit its cells on the NB-IOT UL carrier. This can be used to perform the in E1.1 proposed, phase shift estimation either on the M-PRACH or reserved NB-IOT UL resources. This concept may also be used to utilize the whole RB bandwidth on reserved resources on the NB-IOT UL carrier. Therefore, a special DCI format which describes frequency band and time of PSERS transmission may be used to this end. An exemplary DCI format based on DCI format 4 is presented in Table 2. Here, "OFDM symbol time index for RS Transmission" describes the OFDM symbol index in which the LTE UE should send its PSERS. The "PSERS format indicator" describes which PSERS the LTE UE should send for phase shift estimation.

TABLE 2

Exemplary new DCI format for signaling band and time of RS transmission

| Field name | Length |
| --- | --- |
| Resource block assignment | Allocation of only one RB |
| OFDM symbol time index for RS Transmission | any appropriate length |
| PSERS format indicator | Size depends on number of possible PSERS |

That is, referring to the embodiments of FIGS. 4 and 5, this means that receiver 10 may signal to transmitters ought to send PSERSs, such as transmitter 12$_a$, a message indicating when and, optionally, which PSERS signal the respective transmitter should send.

[E1.3] Iterative Phase Offset Adaption

In principle, there are several ways by way of which the phase shift compensation signal instructs the recipient thereof, i.e. transmitter 12$_a$ in the case of FIGS. 4 and 5, to approximate the state of no phase shift between the superpositioned data signals. For instance, the phase shift compensation signal could indicate the phase or angular rotation at which mapper 24 should rotate the respective constellation onto which the data to be transmitted is mapped relative to a fixed access, such as an access of the complex plane. Alternatively, the phase offset/shift could be signaled as an incremental update information which instructs the transmitter, such as transmitter 12$_a$ of FIGS. 4 and 5, as to how to further change the phase or rotation of the constellation to be used for mapping the data 26 to be transmitted relative to the phase or rotation previously used for the mapping operation of previous data to be transmitted.

Figure 8:
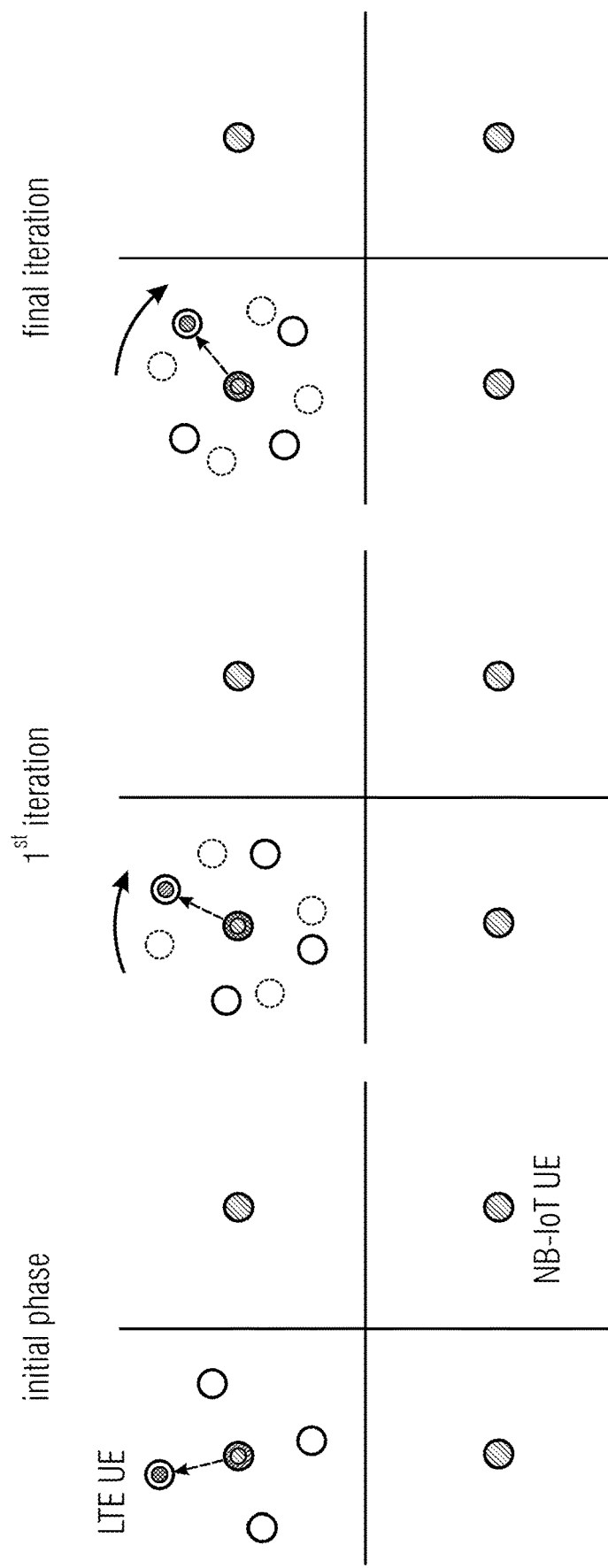
FIG. 8 shows schematically, side-by-side, three 3× composite constellations at the receiver with a first phase compensation iteration from the left to the middle composite constellation, and another phase compensation iteration from the middle to the right-hand composite constellation.

Transferring this to the LTE example, an LTE UE may transmit without phase offset on an IOT carrier, wherein the phase is compensated iteratively by incremental update information. In a first step, the LTE UE would start transmitting on the NB-IOT carrier, whereupon, in a second step, the base station, i.e. eNB will estimate the phase offset and signal the phase update direction and optionally the step size. FIG. 8 illustrates a situation of constant channels, or channels with constant phase offset therebetween, with two iterations until reaching the phase compensated state. At the left-hand side, the first situation is shown where the second data signal's constellation (non-hatched) is rotated relative to the constellation of the first data signal (hatched circles). After a first operation, the situation is as depicted in the middle of FIG. 8. Here, the constellation of the second data signal has been rotated by a first phase offset amount and the situation after a further (final) iteration is shown at the right-hand side. Here, the constellation of the second data signal has been rotated again by a certain amount (here illustratively the same amount as in the first iteration). Now, after the final iteration, both constellations, i.e. of the first and second data signals, are correctly registered to each other.

[E2] Phase Shift Compensation

The base station or receiver can estimate the relative phase offset/shift of different transmitters or UEs by previous uplink transmissions, as described above. In the NB-IOT carrier, the possible solutions explained above in section E1 may be applied to estimate the relative phase offset/shift between IOT devices and LTE UEs. The estimated relative offset is then signaled to, for instance, one UE which adapts its phase offset. With respect to FIGS. 4 and 5, the corresponding signal to do this has been denoted as phase shift compensation signal. The sending of this signal can be done by DCI signaling or RRC messaging, as described below.

[E2.1] New DCI Format to Signal Phase Offsets

Compared to normal LTE, a new DCI format may be used to signal phase offsets/shifts of different bands to the corresponding UE, such as transmitter 12$_a$ of FIGS. 4 and 5. In particular, the DCI format may signal the phase offset/shift for each subband for which phase information is provided in the DCI message. An example of a DCI message is indicated below in Table 3. That is, consider FIGS. 4 and 5. Multi-user superposition coding and the corresponding phase shift estimation and compensation could be performed for a certain frequency range, and the DCI format proposed in Table 3 would signal the phase offset/shift for each subband within this frequency range individually. The number of subbands is indicated as K in Table 3, that is K denotes the number of subbands which corresponds to one resource block for which the concept of multi-user superposition coding with phase shift estimation and compensation is performed. A resource block RB to which the DCI message belongs corresponds to a unit at which the spectrum of subcarriers is assigned to a group of transmitters to which transmitter 12$_a$ belongs, such as LTE UEs. K depends on the overlaid, non-adapting UE being an LTE UE or an NB-IOT. An overlaid non-adapting UE is, for instance, transmitter 12$_b$ of FIGS. 4 and 5 in the case of not comprising a phase shift compensation signal receiver and a phase shift compensation dependent mapper. If the overlaid UE is an NB-IOT device, a subband corresponds to the frequency bandwidth of a resource block RB of an IOT carrier, thus ⅙ of the frequency bandwidth of an LTE UE. It is suggested that the DCI message comprises a phase information block field which contains the relative phase offset information.

That is, imagine that transmitter 12$_a$ transmits its data signals being subject of MUST via a (MUST) band of subcarriers of first OFDM symbols and transmitter 12$_b$ transmits its data signals being subject of MUST via spectrally collocated subcarriers of second OFDM symbols wherein the first OFDM signals are shorter (and are sent more frequently, though), and have a higher spectral subcarrier density than compared to a second OFDM signal. Transmitter 12$_a$ maps its data using a respective constellation in a manner phase shift compensated according to the phase shift compensation signal on the band of spectrally adjacent subcarriers of the first OFDM symbols supposed to superimpose with corresponding collocated subcarriers of the second OFDM symbols from transmitter 12$_b$ which, in turn, performs the mapping without phase shift according to the phase shift compensation signal. Here, the phase shift compensation signal comprises one phase shift value (the K values of size P in Phase information block in Table 3) per spectral subband into which physical resource blocks of the carrier to which the first OFDM symbols of transmitter 12$_a$ belong, within the MUST are is further subdivided by physical resource blocks of the carrier to which the second OFDM symbols of transmitter 12$_b$ belongs. For example, six sub-bands, i.e. six PRBs of transmitter 12$_b$ may spectrally fit into each PRB (physical resource block) belonging to the MUST band.

[E2.1.1] Overhead Reduction for Adjacent Bands Scheduled to the Same UE

Depending on how the RBs are scheduled by the eNB, i.e. the base station or receiver in the case of FIGS. 4 and 5, K can be reduced for adjacent bands. If the overlaid, non-adapting UE, such as transmitter 12$_b$, is scheduled to adjacent bands which will be overlaid by the MUST UE, the signaling overhead can be reduced if the channel conditions are suitable.

[E.2.1.2] Overhead Reduction by Fast and Slow Phase Adaption

The granularity P of the relative phase offset information per subband in the DCI message, an example of which is proposed below in Table 3, can be classified into fast adaption granularity and slow adaption granularity. Slow adaption has a higher granularity and can be used for describing all possible relative phase offsets. Fast adaption has a lower granularity, thus less overhead and can be used to describe limited corrections of the phase offset. That is, the phase shift compensation signal could be sent within messages of a first type and messages of a second type, wherein the messages of the first type are sent less frequently compared to the messages of the second type, and the phase shift compensation signal within the messages of the first type allows for signaling phase offsets not representable by the phase shift compensation signal within the messages of the second type, because, for example, the representable phase shift range in the messages of the first type is enlarged relative to the representable phase shift range in the messages of the second type with the number of representable phase shifts being the same or, alternatively, being greater for messages of the first type relative to messages of the second type. That is, an increased quantization step size could underlie the phase shift compensation signal within messages of a first type compared to the messages of the second type, and the bit length of the phase shift compensation signal within messages of a first type could be increased relative to the messages of the second type.

[E2.1.3] Phase Information Block Format

In accordance with a variant also illustrated in FIG. 3, an indicator, namely phase information block format, could describe the format of the phase information block. This indicator could be used to discriminate between slow and fast phase adaption DCI instead of introducing separate DCI formats for both possibilities. Furthermore it could describe patterns which can be used for overhead reduction for adjacent bands described in E2.1.1.

In other words, the phase shift compensation signal could be sent within messages comprising an indicator field and a phase shift field, wherein a value within the indicator field changes a mapping between a value within the phase shift field and a phase shift value to be used for phase shift compensation such as an quantization and/or an interpretation of the value as incremental correction/update or relative amendment of the most recently applied phase shift in mapping by mapper 24, or as absolute phase shift to be used in mapping as is.

[E2.1.4] Additional Granularity for TPC (Transmit Power Control)

The DCI message exemplified below in Table 3 shows that additionally the granularity of bits signaling the transmit power to be used by the respective recipient of the DCI message may be increased relative to legacy TPC fields to ensure fine adjustment of uplink transmit power. In case of a transmitter or mobile terminal or UE communicating with the base station over aggregated carriers, for instance, it could accordingly be that the DCI message controlling the carrier via which multi-user superposition coding is performed as outlined above, controls the transmit power at a higher bit granularity than compared to the DCI messages controlling the other carrier, which may for instance be the anchor carrier.

TABLE 3

Exemplary new DCI format for signaling phase information based on DCI Format 0

| Field name | Length |
| --- | --- |
| Resource block assignment | |
| Phase information block format | Size depends on variations of phase information block |
| Phase information block | Size depends on K * P, where K is the number of subbands for which the phase information is given and P the granularity of the phase information |
| MCS and RV | 5 bits |
| NDI (New Data Indicator) | 1 bit |
| Extended TPC for PUSCH | 2 + X bits Additional bits for more granular uplink power control |
| Cyclic shift for DM RS | 3 bits |
| UL index (TDD only) | 2 bits |
| Downlink Assignment Index (DAI) | 2 bits |
| CQI request (1 bit) | 1 bit |

[E.2.2] RRC Signaling to Signal Phase Offsets

An RRC signaling to configure this phase offset/shift of the multi-user superposition coding UE may be provided. This could be done with the RRC PhysicalConfigDedicated message. An exemplary signaling structure is shown in FIGS. 9 and 10.

[E.2.3] HARQ ACK/NACK-Like Fast Phase Adaption Signaling in PDCCH

Fast Iterative phase adaptation can be done over the PDCCH channel, either by transmitting a delta within the DCI message or using a separate channel similar to the PHICH. Here, one or more bits signal the direction or amount to shift the phase. An additional option would be to increase the delta when the same direction for shifting is indicated several times, such as in the form of, for instance, a pi regulator.

An implementation example could be an MIB system information where 3 bits are provided for PPICH (physical phase indicator channel) information, namely 1 bit to indicate normal or extended PPICH and 2 bits to indicate the PPICH Ng value.

[E.2.4] Model-Based Phase Signaling

[E2.4.1] A model could be trained to follow the given phase offsets. The used model and model parameters could be signaled from eNB, i.e. receiver, to the respective UE, such as transmitter $12_a$. The set of suitable models and algorithms running at the base station could be standardized, for instance.

[E2.4.2] A prediction of phase rotation over time and/or frequency could be applied and used to weight updates for the applied prediction approach as signalization information in conjunction with an identifier of the prediction algorithm. This identifier could then be used at an UE to classify the reliability of the prediction, i.e. to compensate expected errors, or to pre-adjust the phase offset to be used prior to transmission. The position of the phase information on the PPICH is signaled implicitly by the MUST resource allocation and possible additional cyclic shift.

[E3] Special Subframe for Interference-Free Reception of RS

Figure 11:
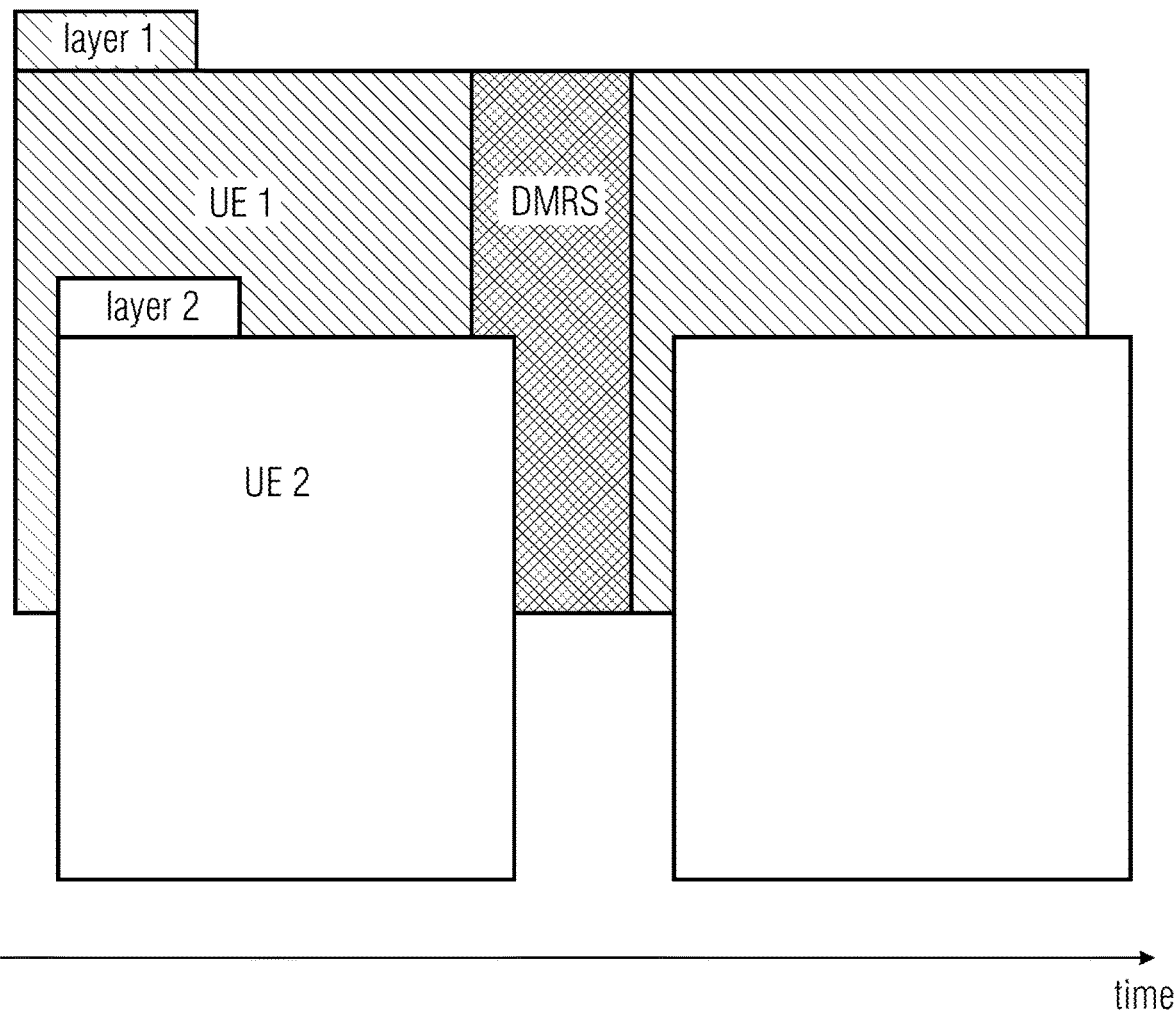
FIG. 11 shows a schematic diagram illustrating the blanking of a subframe on a frequency time resource where UE2 blanks its DMRS.
Figure 12:
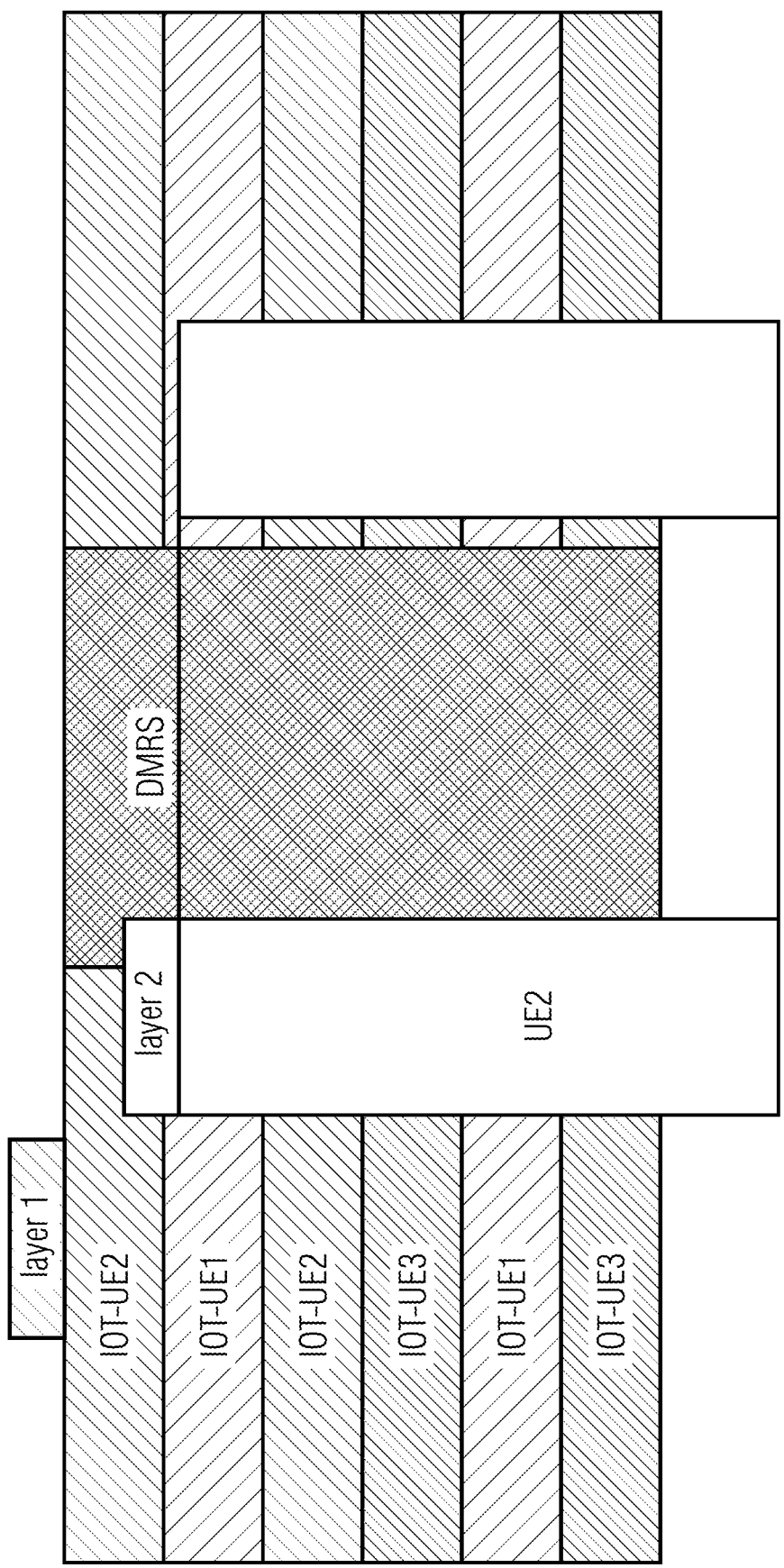
FIG. 12 shows a schematic diagram illustrating an LTE UE blanking 6 OFDM symbols on NB-IoT UL carrier.

For interference-free reception of DMRS and SRS, the base station or eNB or receiver of FIGS. 4 and 5 may tell some UEs to blank-out OFDM symbols, so that only one UE, such as transmitter $12_a$ of FIGS. 4 and 5, is transmitting at the same frequency-time resource as depicted in FIG. 11. This mechanism may be used to multiplex DMRS and SRS in a FDM and/or TDM manner. Whereas a DMRS or SRS occupies a single OFDM symbol for LTE UEs, a DMRS symbol in the NB-IOT UL carrier spans over 6 OFDM symbols in the LTE carrier in time. Thus, the LTE UE should blank 6 OFDM symbols as illustrated in FIG. 12.

[E3.1] DCI Format for Flexible Blanking Subframes

Figure 13:
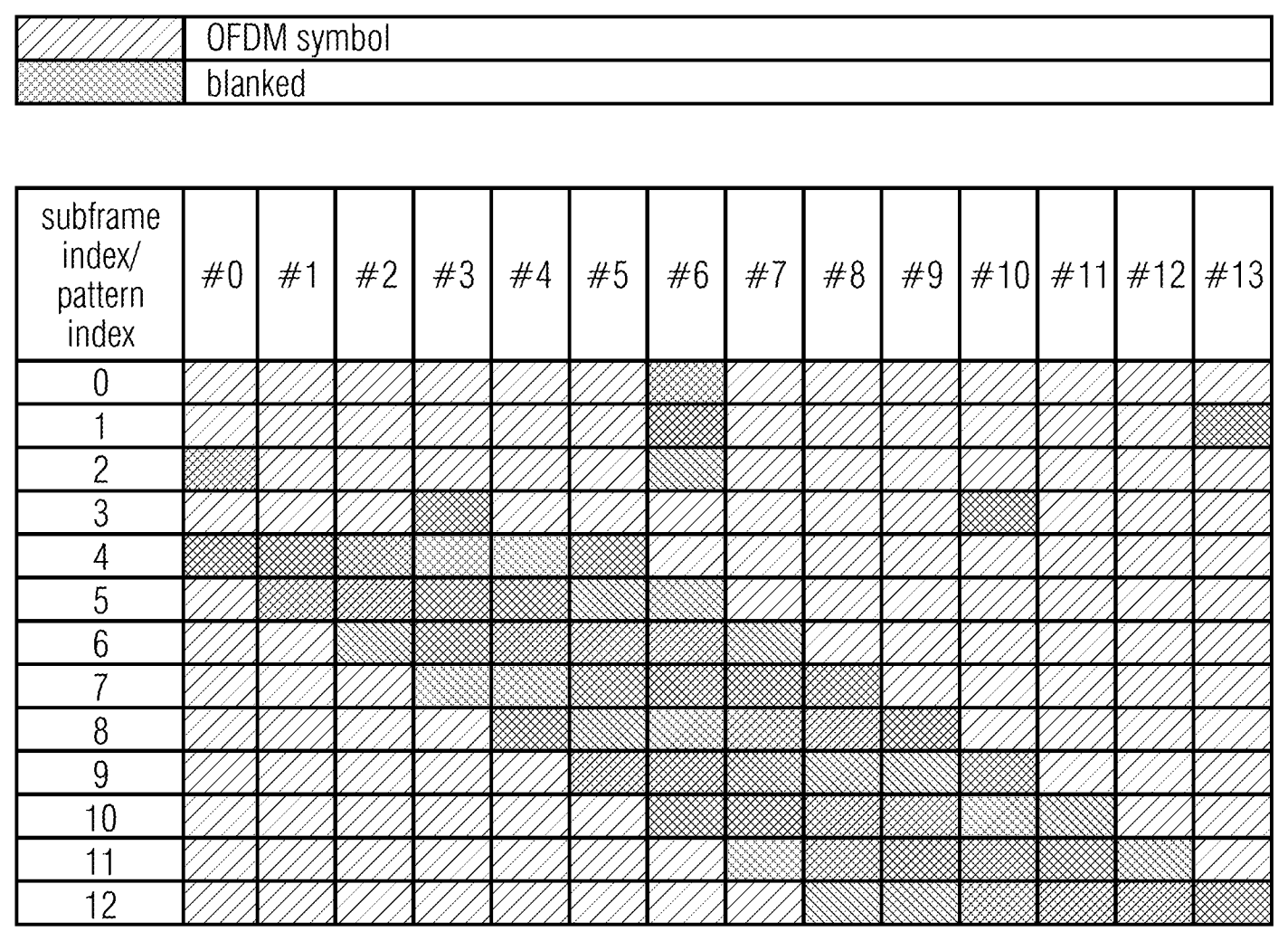

A DCI format including a phase blanking pattern index is exemplarily shown in Table 4. Exemplary blanking patterns for DMRS and SRS blanking are shown in FIG. 13.

TABLE 4

Exemplary new DCI format with special subframe indicator based on DCI Format 0

| Field name | Length |
| --- | --- |
| Resource block assignment | |
| Phase blanking pattern index | Size depends on the number of patterns |
| MCS and RV | 5 bits |
| NDI (New Data Indicator) | 1 bits |
| TPC for PUSCH | 2 bits |
| UL index (TDD only) | 5 bit |
| Downlink Assignment Index (DAI) | 2 bit |
| CQI request | 1 bit |

[E3.2] RRC Signaling for Configuring Semi-Persistent Blanking

Since RS like DMRS or similar often occur on a regular basis, a semi-persistent blanking configuration can be used to reduce the control overhead. For this purpose, an RRC signaling for configuring semi-persistent blanking is shown exemplary in FIG. 14. blankingSubframeIntervalUL describes the interval in subframes. blankingSubframePattern provides for the pattern that should be used for blanking.

Again, imagine that transmitter $12_a$ transmits its data signals being subject of MUST via a (MUST) band of subcarriers of first OFDM symbols and transmitter $12_b$ transmits its data signals being subject of MUST via spectrally collocated subcarriers of second OFDM symbols wherein the first OFDM signals are shorter (and are sent more frequently, though), and have a lower spectral subcarrier density than compared to a second OFDM signal. Transmitter $12_a$ maps its data using a respective constellation in a manner phase shift compensated according to the phase shift compensation signal on the band of spectrally adjacent subcarriers of the first OFDM symbols supposed to superimpose with corresponding collocated subcarriers of the second OFDM symbols from transmitter $12_b$, which, in turn, performs the mapping without phase shift according to the phase shift compensation signal. Transmitter $12_a$ could then be controlled by receiver 10 by a blanking signal instructing the transmitter $12_a$ as to when to blank OFDM transmission so that transmitter $12_b$ can send its RS for channel estimation and/or phase offset estimation without interference. The reference signal of transmitters $12_b$ would be longer than the reference signal of the transmitters ala $12_a$. In other words, the receiver would send to the first transmitter $12a$ a blanking scheduling signal instructing transmitter $12_a$ as to when to blank OFDM transmission in order not to interfere with at least a subset of channel estimation reference signals sent by transmitter $12_b$ for channel estimation purposes, which transmitter $12_b$ might be even agnostic with respect to the co-allocation of its resources to transmitter $12_a$. Channel estimation reference signal may include DMRS which accompany payload transmission by interspersed pilot symbols so as to correctly receive uplink transmissions from the respective transmitter, and/or SRS which are sent intermittently by all transmitters to estimate the individual channel conditions and decide on the uplink scheduling. The receiver would then perform channel estimation on the basis of second channel estimation reference signals sent by transmitter $12_b$. Receiver 10 would do the same with first channel estimation reference signals sent from transmitter $12_a$ which are shorter than the second channel estimation reference signals of transmitter $12_b$. However, usage of the channel estimation reference signals for channel estimation, i.e. estimating transmitter's $12_a$ channel and transmitter's $12_b$ channel, respectively, would be possible even with concurrent transmission from transmitters $12_a$ and $12_b$. The subset of second channel estimation reference signals for which transmitter $12_a$ is instructed to blank its transmission, however, are also used as phase shift estimation reference signal for phase shift estimation. For example, receiver 10 determines phase shift on the basis of an evaluation of just-mentioned channels estimation reference signals from transmitter $12_b$ on the one hand for which transmitter $12_a$ has performed blanking, and phase shift estimation reference signals sent by transmitter $12_a$ in the PRACH of transmitter $12_b$, as outlined previously, for example. Naturally, both transmitters $12_a$ and $12_b$ might be recipients of respective blanking instructions from receiver 10 and blank transmissions during channel estimation reference signals sent by the respective other transmitter so as to render the non-interfered channel estimation reference signals of both transmitters available for phase shift estimation purposes. Naturally, same concept may be used if transmitters $12_a$ and $12_b$ operate on the same OFDM symbol length and spectral sub-carrier density, and is also transferable onto a higher number of MUST transmitters. The blanking scheduling signal may be contained in a downlink control information (DCI) message and/or via a radio resource control (RRC) message. A RRC message could be used to configure an interval on subframe basis, such that the first transmitter $12a$ is instructed to blank OFDM transmission periodically till released by some further message.

[E4] Multi-User BPSK Constellation Superposition

Figure 15:
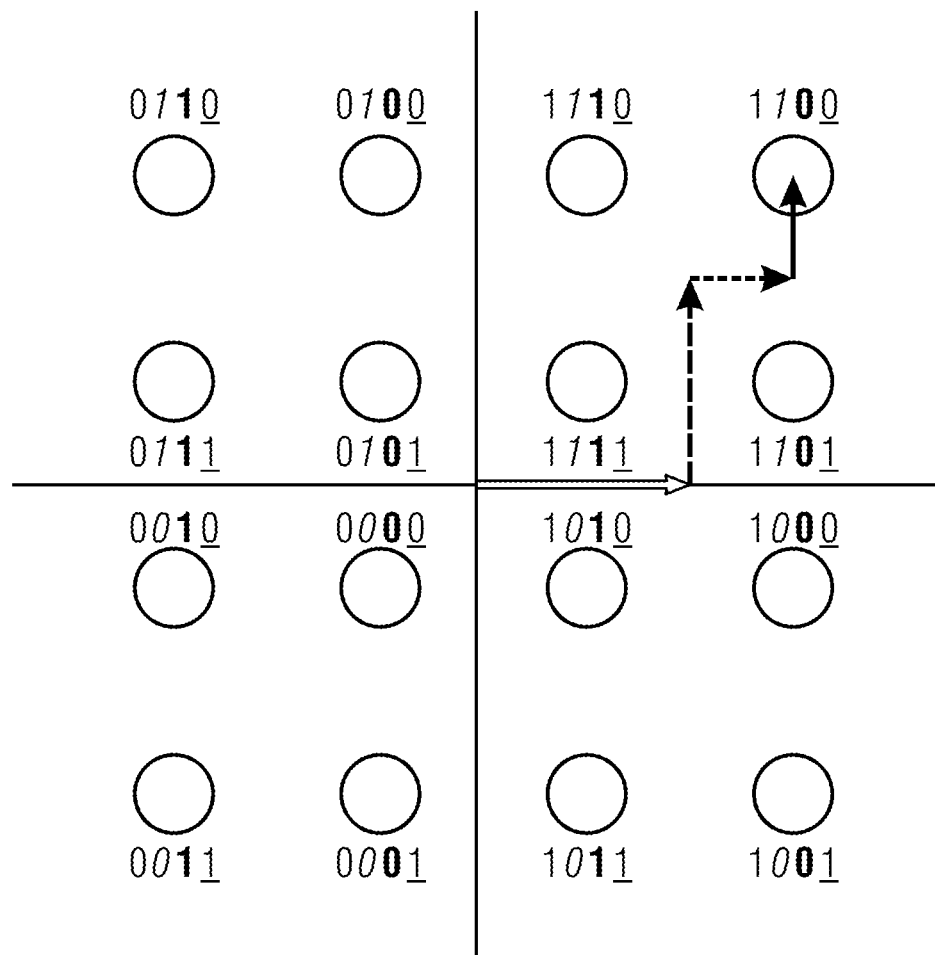
FIG. 15 shows a schematic diagram illustrating a superposition of 4 BPSK transmissions.

Superposition of QAM signals as shown in FIG. 3 allows allocating 2 UEs in the same UL resource, e.g. 2 UEs in 16QAM constellation with 2 Bits/UE/constellation. The idea in [E4] is to use BPSK constellation for scheduling 4 UEs in a 16 QAM constellation with 1 Bit/UE/constellation, as shown in FIG. 15.

Superposition of 4 BPSKs into a 16QAM raster may use adaption of power and rotation of the BPSK signal in addition to the phase shift compensation in [E2]. 2 UEs are non-rotated and only adapted in power domain. The two other UEs are rotated by 90°. As already described above, power allocation can be initiated using regular UL power control.

Whereas rotation of BPSK signals needs to be signaled in the RRC Physical channel reconfiguration to the specific UEs.

The number of UEs can be increased by using higher constellations (>16QAM) on the receiver side by superposition of multiple BPSK signals (e.g. 8 UEs in 256QAM).

See FIGS. 4 and 5. Here, the data signals participating in MUST, may be N>1 data signals, i.e. two as discussed in FIGS. 4 and 5, so far, or even greater. The target ratio may be $a_1:a_2:\ldots:a_N$ from a first to $N^{th}$ data signal, with $a_1, a_2 < a_3$, $a_4 < \ldots < a_N$. Each data signal is separately BPSK modulated with the $(2n+1)^{th}$ data signal's BPSK constellation being rotated relative to the $(2(n+1))^{th}$ data signal's data signal's BPSK constellation, with $-1 < n < N/2$. The receiver would use, for demapping the superposition, a composed constellation resulting from recursively copying the BPSK constellations of the $N^{th}$ to first data signals one upon the other sequentially.

Figure 16:
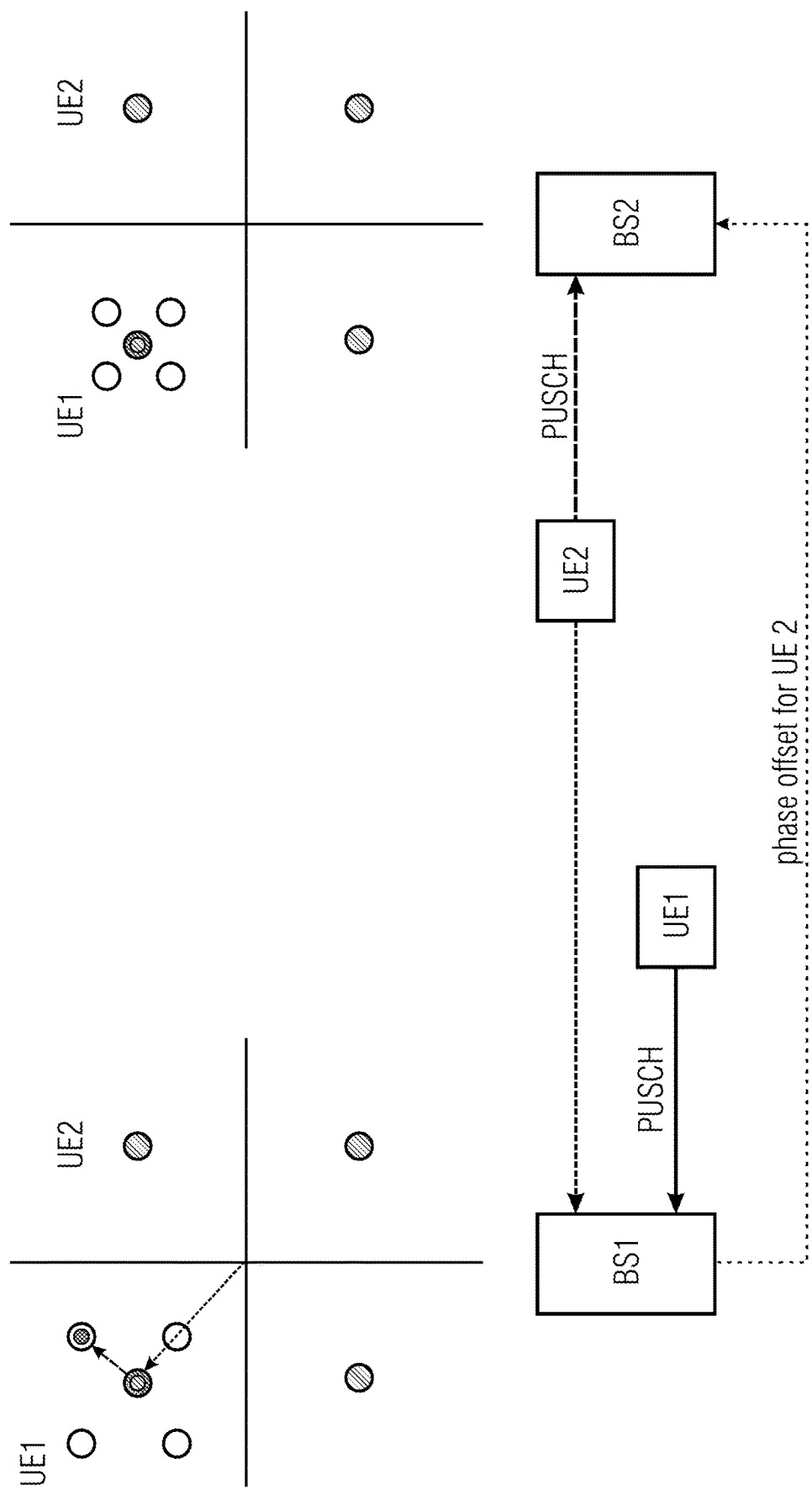
FIG. 16 shows a schematic diagram illustrating receiver and transmitters in accordance with the an embodiment using the multi-user superposition coding concept taught with respect to the previous figures for inter-cell interference reduction.

FIG. 16 shows a system comprising two base stations BS1 and BS2, thus forming receivers, respectively, in the sense of FIGS. 4 and 5, and two UES UE1 and UE2, i.e. transmitters, respectively, in the sense of FIGS. 4 and 5. FIG. 16 shows that the concepts taught above for enabling MUST UL transmission may be used to improve inter-cell interference situations. In situations, where otherwise certain spectral resources such as sub-carriers used for UL transmission by UE1 towards BS1 would by blocked or kept non-allocated to UEs served by BS2 such as UE2, both base stations BS1 and BS2 may allocate these spectral resources to UE1 and UE2 for their respective UL transmissions to BS1 and BS2, respectively. That is, in FIG. 16, UE1 is served by BS1 and UL transmits to BS1, and UE2 is served by BS2 UL transmits to BS2. UE1 is near BS1 and far away from BS2, thus not interfering the UL transmission of UE2 to BS2, but UE2 is equally far to BS1 and BS2, thus interfering the UL transmission of UE1 to BS1. The UL transmissions inspected here are not MUST UL transmission. Nevertheless, UE2 is assumed to act like, or to be construed like, transmitter $12_a$. That is, it comprises the receiver 22 and the above-taught mapper functionality depending on the phase correction. For UE2, this is optional like it was for transmitter $12_b$, but it sends out a PERSE. Base station BS1 has a special demapping functionality, but is not interested in obtaining the information data for the data signals sent from UE2, but merely uses MUST to separate the information data conveyed by data signals from UE1 from those of UE2. Otherwise, BS1 corresponds to the structure of receiver 10 of FIGS. 4 and 5. BS2 needs not to have MUST demapping functionality, but may have. BS2, however, may communicate with BS1 in the manner outlined below, to forward to UE2 a phase shift compensation signal corresponding to the one outlined above to UE2. The details in this regard, i.e. with respect to possible phase shift correction signals, having brought forward above, may also applied here.

Using the terminology of FIGS. 4 and 5, receiver BS1 receives a wanted data signal from served transmitter UE1. Receiver BS1 estimates a phase shift between channels via which the receiver BS1 receives the wanted data signal from UE1 and a interfering data signal sent from transmitter UE2 served by a further receiver BS2 in a manner superpositioned with the wanted data signal from UE1. Thereby, BS1 obtains a phase shift information between the channels. Above concepts for scheduling PSERS transmission and so forth, may be used. BS1 may send a phase shift compensation signal to the further base station BS2 so as to be forwarded to the further transmitter UE2, the phase shift compensation signal depending on the phase shift information. All details with respect to this signal may be used here as well. The transmitter UE2 processes the phase shift compensation signal in the manner outlined above, but with another aim. That is, it pre-phase shifts the constellation used for mapping onto the—with respect to BS1-UE1 UL communication—interfering data signal. The phase shift correction is not a big deal for BS2, as BS2 is not interested to perform any MUST demapping. BS1, however, is now able to demap the wanted data signal by performing demapping on the superposition of the wanted and interfering data signals from UE1 and UE2 using multi-user superposition decoding to obtain an information data for the wanted data signal sent from UE1 due to the phase shift correction. Additionally or alternatively, phase shift compensation is done in UE1.

Figure 17A:
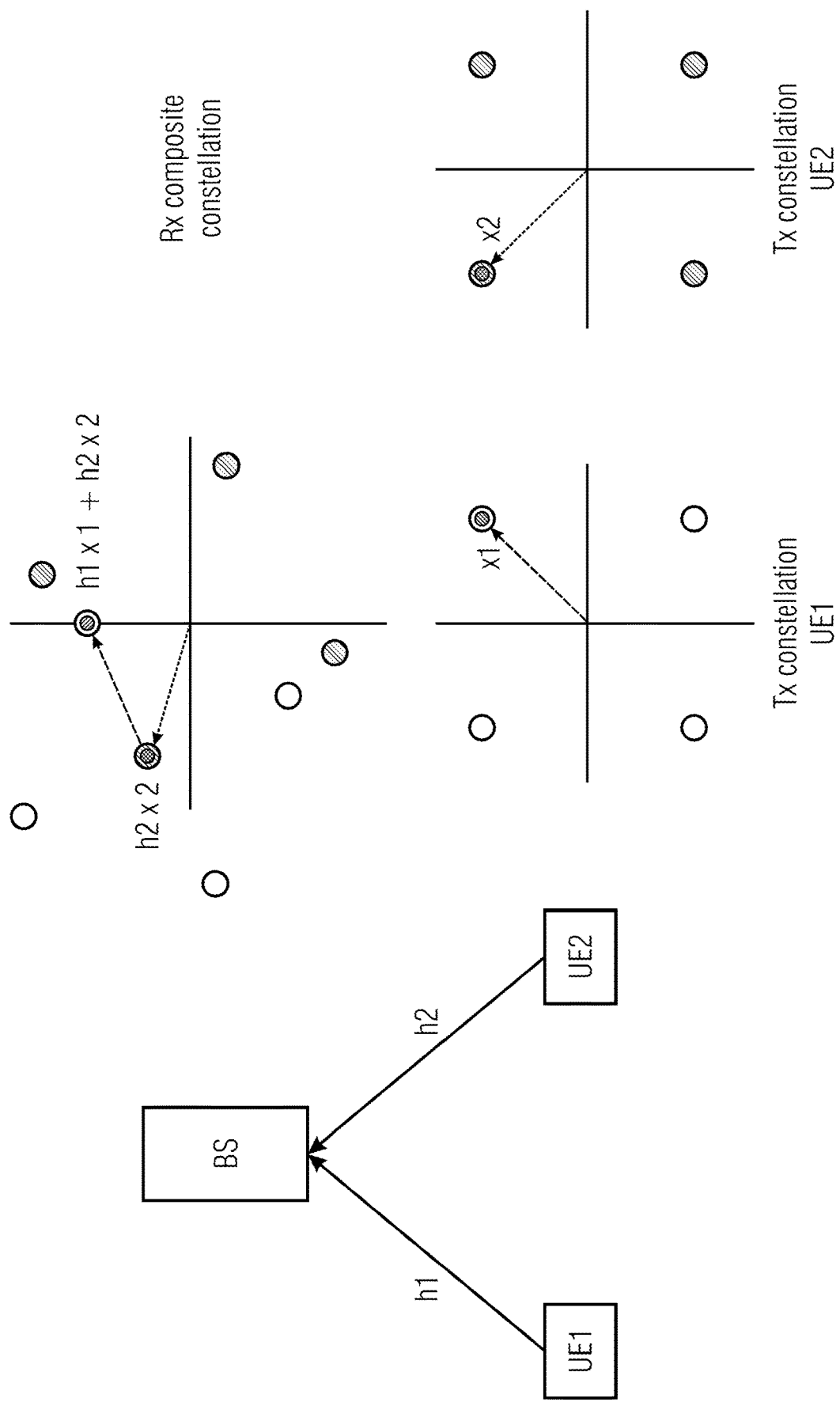
Figure 17B:
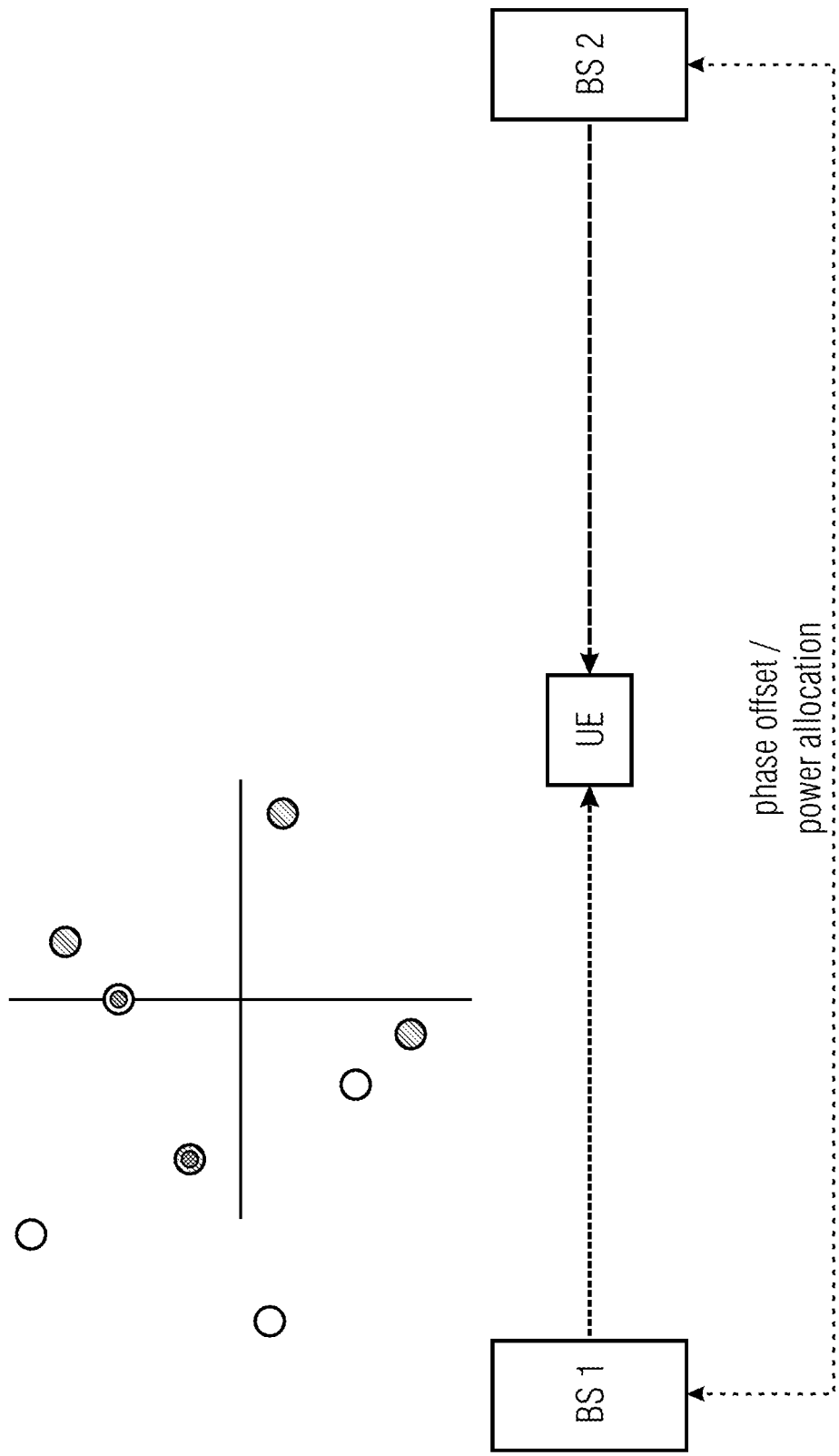

As announced above, the concepts described above may also by applied to DL (downlink) MUST or downlink interference coordination. In order to show as to how the above description may readily be transferred onto the downlink case the following description maps the previous description onto the scenarios depicted in FIGS. 17b and 17c. Let's attend to FIG. 4 and interpreting transmitters $12a$ to $12c$ as being base stations such as $12a$ being BS1 and $12b$ BS2 of FIG. 17b, and interpreting receiver 10 as a mobile terminal or user entity UE. That is, receiver 10 is for receiving data signals from transmitters $12_a$ and $12_b$ using multi-user superposition coding and the transmitters $12_a$ and $12_b$, in turn, are for transmitting a respective data signal for reception at the receiver 10 in a manner superimposed mutually. Receiver UE may, here, be in a carrier aggregation mode so as to aggregate carriers from BS1 and BS2. The superimposing channels 16a and 16b may be part of these aggregated carriers. Transmitter's BS1 and transmitter's BS2 phase shift estimation reference signal sender 14 sends a phase shift estimation reference signal to receiver UE. Using the phase shift estimation reference signal, receiver's UE phase shift estimator 18 estimates the phase shift between the channels 16a and 16b via which the corresponding transmitters BS1 and BS2 sends their data signals subject to multi-user superposition coding. UE is free to send the phase shift compensation signal to BS1 or BS2 or both. Note that BS1 and BS2 may be configured to coordinate their PSERS transmissions via their network interconnection such as the X2 interface so that the phase shift estimation reference signals are received at receiver UE sequentially and individually without collision or coincidence, and that BS1 and BS2 may mutually inform each other on received compensation signals, received from the UE. That is, receiver's UE phase shift compensation signal sender 20 derives from the phase shift estimator 18 the phase shift information between the channels obtained by the phase shift estimation and sends a phase shift compensation signal to at least one of the plurality of transmitters BS1 and BS2, namely the phase shift compensation signal receiver 22 within the respective transmitter BS1 and/or BS2. The phase shift compensation signal may, for instance, be included within uplink control information (UCI) messages and/or radio resource control (RRC) uplink messages. Within the transmitter BS1, mapper 24 maps data to be transmitted using a certain constellation in a manner phase shift compensated according to the phase shift compensation signal, thereby obtaining the data signal finally to be sent over channel 16a to receiver UE in a manner superimposed by a corresponding data signal sent from transmitter BS2. Data mapper 24 of BS1 may map the data 26 to be transmitted onto a certain constellation selected, for instance, on the basis of certain channel conditions such as QPSK, QAM or the like, wherein data mapper 24 rotates its constellation to account for the phase shift between its channel 16a and the channel 16b of the multiple-user superposition partner BS2. The thus obtained data signal 28 is then, for instance, used to form a certain OFDM subcarrier of an OFDM or SC-FDM or OFDMA or SC-FDMA signal finally sent out by transmitter BS1 to receiver UE so that the mentioned subcarrier coincides with the subcarrier onto which a corresponding mapper of transmitter BS2 maps its own data. As described above, within the receiver UE, demapper 30 receives the superpositioned data signal, i.e. the superposition of the data signal on the corresponding OFDM subcarrier, indicated with 32, which points to a certain point in the complex plane, and obtains, by performing the demapping, an information data for each data signal, i.e. data signal 28 sent from transmitter BS1 and the corresponding data signal sent from transmitter BS2. As described above, receiver UE may additionally comprises a power ratio estimator 36 configured to estimate a power ratio between the plurality of transmitters to obtain a power ratio information, and a sender 38 which sends a power ratio compensation signal depending on the power ratio information to at least one of transmitters BS1 and BS2, where this signal is received by a corresponding power ratio compensation signal receiver 40 so that the transmitter such as BS1 may set a power at which the data signal 28 is transmitted depending on the power ratio compensation signal. Similarly, the details described above with respect to FIG. 16, may readily be mapped onto the DL situation of FIG. 17c in order to improve inter-cell DL interference situations. Imagine, UE2 and UE1 were positioned near to each other and UE2 would be in MUST mode so as to receive a DL signal from BS2 piggy packed onto the signal which UE1 receives on the same physical resource from BS1 wherein UE1 may even be agnostic with respect to this circumstance. Possibly, neither UE1 nor UE1 is in carrier aggregation mode. BS2 acts like transmitter $12_a$. That is, it sends out a PSERS by sender 14 and comprises the receiver 22 and the above-taught mapper functionality depending on the phase correction. BS1 may, for instance, merely send out a PSERS, but it may not have a receiver and the special mapper functionality. UE2 has a special demapping functionality, but is not interested in obtaining the information data for the data signals sent from BS1, but merely uses MUST to separate the information data conveyed by data signals from BS2 from those of BS1. Otherwise, UE2 corresponds to the structure of receiver 10 of FIGS. 4 and 5. UE1 may needs not to have MUST demapping functionality, but may have. UE2, thus, receives two PSERS, one from BS1 and another from BS2. As UE 2 is served by BS2, it may signal the phase shift compensation signal to BS2. BS2 may forward to BS1 the phase shift compensation signal it receives from UE2 for controlling the phase shift compensation in data mapping and/or control phase shift compensation in data mapping itself. Similar issues may be performed with respect to power control. Any network interconnection such as the X2 interface, may be used for signal forwarding or information exchange between BS1 and BS2.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The participating signals noted above can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.859 v13.0.0 (2015-12)
[2] 3GPP TR 45.820 v13.1.0 (2015-11)

| ABBREVATIONS | |
| --- | --- |
| eNB | Evolved Node B (3G base station) |
| LTE | Long-Term Evolution |
| IRC | Interference Rejection Combining |
| SIC | Successive Interference Cancellation |
| UE | User Equipment (User Terminal) |
| RRM | Radio Resource Management |
| TDD | Time Division Duplex |
| FDD | Frequency Division Duplex |
| MIMO | Multiple Input Multiple Output |
| OFDM | Orthogonal Frequency Division Duplexing |
| OFDMA | Orthogonal Frequency-Division Multiple Access |
| CQI | Channel Quality Information |
| CRC | Cyclic Redundancy Check |

-continued

| ABBREVIATIONS | |
|---|---|
| DMRS | Demodulation Reference Signal |
| SPS | Semi-persistent Scheduling |
| DCI | Downlink Control Information |
| UL | Uplink |
| DL | Downlink |
| (s)TTI | (short) Transmission Time Interval |
| PUSCH | Physical Uplink Shared Channel |
| PUCCH | Physical Uplink Control Channel |
| PDSCH | Physical Downlink Shared Channel |
| PDCCH | Physical Downlink Control Channel |
| SIC | Successive Interference Cancellation |
| URLLC | Ultra-reliable Low-latency Communications |
| MBSFN | Multimedia Broadcast Single Frequency Network |
| C-RNTI | Cell Radio Network Temporary Identity |

The invention claimed is:

1. A receiver for receiving data signals from a plurality of transmitters using multi-user superposition coding, the receiver configured to
estimate a phase shift between channels via which the receiver receives the data signals to acquire a phase shift information between the channels;
send a phase shift compensation signal to at least one of the plurality of transmitters, the phase shift compensation signal depending on the phase shift information; and
demap the data signals by performing demapping on a superposition of the data signals to acquire information data per data signal,
wherein the receiver is configured to send the phase shift compensation signal such that the phase shift compensation signal instructs the at least one of the plurality of transmitters to reduce the phase shift between the channels,
wherein the receiver is further configured to
estimate a power ratio between the channels via which the receiver receives the data signals to acquire a power ratio information;
send a power ratio compensation signal to at least one of the plurality of transmitters, the power ratio compensation signal depending on the power ratio information,
the power ratio compensation signal depending on the power ratio information and the phase shift compensation signal depending on the phase shift information such that
the phase shift compensation signal reduces a phase shift between the channels; and
the power ratio compensation signal reduces a deviation of the power ratio between the channels from a target ratio.

2. The receiver according to claim 1, wherein the number of data signals and transmitters is two, respectively, and the target ratio is outside interval [0.9, 1.1] and inside interval [0.1, 10].

3. The receiver according to claim 1, wherein the data signals are N>1 data signals, the target ratio is $a_1:a_2: \ldots : a_N$ from a first to $N^{th}$ data signal, with $a_1, a_2 < a_3, a_4 < \ldots < a_N$, each data signal being separately binary phase shift keying (BPSK) modulated with the $(2n+1)^{th}$ data signal's BPSK constellation being rotated relative to the $(2(n+1))^{th}$ data signal's data signal's BPSK constellation, with $-1 < n < N/2$, wherein the receiver is configured to use, for demapping the superposition, a composed constellation resulting from recursively copying the BPSK constellations of the $N^{th}$ to first data signals one upon the other sequentially.

4. The receiver according to claim 1, wherein the data signals are modulated separately according to respective modulation schemes and the receiver is configured to use, for demapping the superposition, a composed constellation resulting from copying a first constellation of a modulation scheme of a first data signal at constellation points of a second constellation of a modulation scheme of a second data signal.

5. The receiver according to claim 1, wherein the receiver is configured to receive the data signals via spectrally collocated subcarriers of OFDM signals from the plurality of transmitters, wherein resource blocks of first OFDM signals from a first transmitter are subdivided into K sub-bands corresponding to physical resource blocks of second OFDM signals sent from a second transmitter.

6. A receiver for receiving data signals from a plurality of transmitters using multi-user superposition coding, the receiver configured to
estimate a phase shift between channels via which the receiver receives the data signals to acquire a phase shift information between the channels;
send a phase shift compensation signal to at least one of the plurality of transmitters, the phase shift compensation signal depending on the phase shift information; and
demap the data signals by performing demappinq on a superposition of the data signals to acquire information data per data signal,
wherein the receiver is configured to receive the data signals via spectrally collocated subcarriers of orthogonal frequency division multiplex (OFDM) signals from the plurality of transmitters, wherein physical resource blocks of first OFDM signals from a first transmitter, in units of which subcarrier allocation is performed, are spectrally subdivided into sub-bands corresponding to physical resource blocks of second OFDM signals sent from a second transmitter,
wherein the receiver is configured to receive the first and second data signals using multi-user superposition, wherein the receiver is configured to send the phase shift compensation signal to the first transmitter so that the phase shift compensation signal comprises a phase shift value per spectral subband of the spectral subbands into which physical resource blocks of a spectrum of subcarriers of the first OFDM signals are spectrally subdivided.

7. A receiver for receiving data signals from a plurality of transmitters using multi-user superposition coding, the receiver configured to
estimate a phase shift between channels via which the receiver receives the data signals to acquire a phase shift information between the channels;
send a phase shift compensation signal to at least one of the plurality of transmitters, the phase shift compensation signal depending on the phase shift information; and
demap the data signals by performing demappinq on a superposition of the data signals to acquire information data per data signal,
wherein the receiver is configured to send to the first transmitter a blanking scheduling signal instructing the first transmitter as to when to blank orthogonal frequency division multiplex (OFDM) transmission in order not to interfere with at least a subset of second channel estimation reference signals sent by the second transmitter for channel estimation purposes, wherein the receiver is configured to perform channel estimation on the basis of second channel estimation reference signals sent by the second transmitter.

8. The receiver according to claim 7, wherein the receiver is configured to use the subset of second channel estimation reference signals as phase shift estimation reference signal.

9. The receiver according to claim 7, wherein the receiver is configured to send the blanking scheduling signal via one or more of a downlink control information message and a radio resource control message.

10. The receiver according to claim 1, wherein the receiver is configured to send to the at least one of the plurality of transmitters a reference-signal scheduling signal instructing the at least one of plurality of transmitters with respect to at least one of when to send, and on which spectral band to send, a phase shift estimation reference signal to the receiver, wherein the receiver is configured to perform the phase shift estimation on the basis of the phase shift estimation reference signal.

11. The receiver according to claim 10, wherein the receiver is configured to indicate within the reference-signal scheduling signal the phase shift estimation reference signal out of a number of possible phase shift estimation reference signals.

12. The receiver according to claim 10, wherein the receiver is configured to send the reference signal scheduling signal via at least one of a downlink control information message and a radio resource control message.

13. The receiver according to claim 1, wherein the receiver is configured to send the phase shift compensation signal via at least one of a downlink control information message and a radio resource control message.

14. The receiver according to claim 1, wherein the receiver is configured to send the phase shift compensation signal within messages of a first type and messages of a second type, wherein the messages of the first type are sent less frequently compared to the messages of the second type, and the phase shift compensation signal within the messages of the first type allows for signaling phase offsets not representable by the phase shift compensation signal within the messages of the second type.

15. The receiver according to claim 1, wherein the receiver is configured to send the phase shift compensation signal within messages comprising an indicator field and a phase shift field, wherein a value within the indicator field changes a mapping between a value within the phase shift field and a phase shift value to be used for phase shift compensation.

16. The receiver according to claim 1, wherein the receiver is configured to send the phase shift compensation signal in a manner indicating a phase shift to be taken into account next relatively to a current phase shift.

17. The receiver according to claim 1, wherein the receiver is configured to predict the phase shift on the basis of weighting past phase shifts using a prediction algorithm determined by weights and send an update of the weights as phase shift compensation signal.

18. The receiver according to claim 1, wherein the receiver is configured to train a model to follow the phase shift and send information on the model trained as phase shift compensation signal.

19. The receiver according to claim 1, wherein the receiver is a base station and the data signals are transmitted by the plurality of transmitters in uplink direction to the receiver, or the receiver is a mobile terminal and the data signals are transmitted by the plurality of transmitters in downlink direction to the receiver, with the transmitters being separate base stations.

20. A receiver for receiving data signals from a plurality of transmitters using multi-user superposition coding, the receiver configured to estimate a phase shift between channels via which the receiver receives the data signals to acquire a phase shift information between the channels;

send a phase shift compensation signal to at least one of the plurality of transmitters, the phase shift compensation signal depending on the phase shift information; and demap the data signals by performing demappinq on a superposition of the data signals to acquire information data per data signal, wherein the receiver is a base station of, and the plurality of transmitters are mobile terminals of, an OFDM/SC-FDM (OFDM=orthogonal frequency division multiplex; SC-FDM=Single Carrier Frequency Division Multiplexing) or an OFDMA/SC-FDMA (OFDMA=Orthogonal Frequency-Division Multiple Access; SC-FDMA=Single Carrier Frequency Division Multiple Access wireless communication system, wherein the data signals are received on frequency-overlapping subcarriers of temporally overlapping OFDM symbols provided by the plurality of transmitters in uplink direction.

21. A transmitter for transmitting a data signal with superposition with a further data signal of a further transmitter at a receiver seeking to receive at least the further data signal using multi-user superposition coding, the transmitter configured to send a phase shift estimation reference signal to the receiver;

receive a phase shift compensation signal responsive to the phase shift estimation reference signal; and map data using a constellation in a manner phase shift compensated according to the phase shift compensation signal to acquire the data signal.

22. The transmitter according to claim 21, wherein the transmitter is further configured to receive a power ratio compensation signal from the receiver or a recipient of the data signal, set a power, at which the data signal is transmitted, depending on the power ratio compensation signal.

23. The transmitter according to claim 21, wherein the transmitter is configured to transmit the data signal via a subcarrier of an orthogonal frequency division multiplex (OFDM) signal with the further data signal being transmitted via a spectrally collocated subcarrier of a second OFDM signal, wherein the first OFDM signal is sent more frequently and has a lower spectral sub-carrier density than compared to a second OFDM signal.

24. The transmitter according to claim 23, wherein the transmitter is configured to map data using a respective constellation in a manner phase shift compensated according to the phase shift compensation signal on a band of spectrally adjacent subcarriers of the first OFDM signal so as to lead to a superposition with corresponding collocated subcarriers of the second OFDM signal, wherein the transmitter is configured to read from the phase shift compensation signal a phase shift value per spectral subband into which physical resource blocks of the carrier to which the first OFDM signal belongs, is further subdivided by physical resource blocks of the carrier to which the second OFDM signal belongs.

25. The transmitter according to claim 21, configured to, responsive to a blanking scheduling signal from the receiver or the recipient of the data signal, as to when to blank orthogonal frequency division multiplex (OFDM) transmission in order not to interfere with at least a subset of second channel estimation reference signals sent by the further transmitter for channel estimation purposes.

26. The transmitter according to claim 25, configured to receive the blanking scheduling signal via at least one of a downlink control information message and via a radio resource control message.

27. The transmitter according to claim 21, configured to send the phase shift estimation signal at an end of active phases of a Physical Random Access Channel.

28. The transmitter according to claim 21, wherein the transmitter is further configured to
  receive a reference-signal scheduling signal from the receiver or the recipient of the data signal; and
  send a phase shift estimation reference signal to the receiver at least one of a time scheduled depending on the reference-signal scheduling signal, and a spectral band depending on, the reference-signal scheduling signal.

29. The transmitter according to claim 28, wherein the transmitter is configured to construct the phase shift estimation reference signal depending on the reference-signal scheduling signal.

30. The transmitter according to claim 28, wherein the transmitter is configured to receive the reference-signal scheduling signal via at least one of a downlink control information message and a radio resource control message.

31. The transmitter according to claim 21, wherein the transmitter is configured to receive the phase shift compensation signal via at least one of a downlink control information message and a radio resource control message.

32. The transmitter according to claim 21, wherein the transmitter is configured to receive the phase shift compensation signal within messages of a first type and messages of a second type, wherein the messages of the first type are received less frequently compared to the messages of the second type, and the transmitter is configured to interpret the phase shift compensation signal within the messages of the first type as signaling phase offsets not representable by the phase shift compensation signal within the messages of the second type.

33. The transmitter according to claim 21, wherein the transmitter is configured to receive the phase shift compensation signal within messages comprising an indicator field and a phase shift field, and to change, depending on a value within the indicator field, a mapping between a value within the phase shift field and a phase shift value used for the phase shift compensated mapping of the data.

34. The transmitter according to claim 21, wherein the transmitter is configured to rotate the constellation depending on the phase shift compensation signal relative to a predetermined fixed rotational state or relative to a current rotational state.

35. The transmitter according to claim 21, wherein the transmitter is configured to predict a phase shift used in the mapping on the basis of weighting past phase shifts using a prediction algorithm determined by weights and update of the weights according to the phase shift compensation signal.

36. The transmitter according to claim 21, wherein the transmitter is configured to receive information on a model via the phase shift compensation signal and use the model to follow a phase shift used in the mapping.

37. The transmitter according to claim 21, wherein the receiver is a base station and the data signal is transmitted in uplink direction to the receiver, or the receiver is a mobile terminal and the data signal is transmitted in downlink direction to the receiver, with the transmitter and the further transmitter being separate base stations.

38. The transmitter according to claim 21, wherein the receiver is a base station of, and the transmitter is a mobile terminal of, an OFDM/SC-FDM (OFDM=orthogonal frequency division multiplex; SC-FDM=Single Carrier Frequency Division Multiplexing) or an OFDMA/SC-FDMA (OFDMA=Orthogonal Frequency-Division Multiple Access; SC-FDMA=Single Carrier Frequency Division Multiple Access) wireless communication system, wherein the data signal is transmitted on subcarriers of a OFDM symbol.

39. A receiver for receiving a wanted data signal from a served transmitter, the receiver configured to
  estimate a phase shift between channels via which the receiver receives the wanted data signal and an interfering data signal sent from a transmitter served by a further receiver in a manner superpositioned with the wanted data signal to acquire a phase shift information between the channels;
  send a phase shift compensation signal to the further receiver so as to be forwarded to the further transmitter, the phase shift compensation signal depending on the phase shift information; and
  demap the wanted data signal by performing demapping on a superposition of the wanted and interfering data signals using multi-user superposition decoding to acquire an information data for the wanted data signal.

* * * * *